(12) United States Patent  
Su et al.

(10) Patent No.: US 11,722,647 B2
(45) Date of Patent: *Aug. 8, 2023

(54) UNMANNED AERIAL VEHICLE IMAGING CONTROL METHOD, UNMANNED AERIAL VEHICLE IMAGING METHOD, CONTROL TERMINAL, UNMANNED AERIAL VEHICLE CONTROL DEVICE, AND UNMANNED AERIAL VEHICLE

(71) Applicant: SZ DJI TECHNOLOGY CO., LTD., Shenzhen (CN)

(72) Inventors: Guanhua Su, Shenzhen (CN); Chuyue Ai, Shenzhen (CN); Zhuo Guo, Shenzhen (CN); Ruoying Zhang, Shenzhen (CN); Jie Qian, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,683

(22) Filed: Mar. 28, 2022

(65) Prior Publication Data

US 2022/0224865 A1 Jul. 14, 2022

Related U.S. Application Data

(63) Continuation of application No. 16/677,655, filed on Nov. 7, 2019, now Pat. No. 11,290,692, which is a (Continued)

(51) Int. Cl.
*H04N 7/18* (2006.01)
*B64C 39/02* (2023.01)
(Continued)

(52) U.S. Cl.
CPC ........... *H04N 7/185* (2013.01); *B64C 39/024* (2013.01); *G05D 1/0094* (2013.01); *H04N 23/62* (2023.01);
(Continued)

(58) Field of Classification Search
CPC ............... H04N 7/185; H04N 5/23245; H04N 5/23203; H04N 5/23216; G05D 1/101
See application file for complete search history.

(56) References Cited

U.S. PATENT DOCUMENTS

2018/0237140 A1 8/2018 Li et al.
2019/0064794 A1 2/2019 Chen

FOREIGN PATENT DOCUMENTS

CN 202814399 U 3/2013
CN 104828256 A 8/2015
(Continued)

OTHER PUBLICATIONS

The World Intellectual Property Organization (WIPO) International Search Report for PCT/CN2017/083488 dated Jan. 31, 2018 5 pages.

*Primary Examiner* — On S Mung
(74) *Attorney, Agent, or Firm* — Anova Law Group, PLLC

(57) ABSTRACT

An imaging control method for an unmanned aerial vehicle ("UAV") includes receiving a video capturing instruction from a control terminal, determining, based on an imaging scene, a combined action mode, and capturing a video based on the combined action mode. The combined action mode includes a plurality of action modes, the plurality of action modes are different from each other, and the plurality of action modes include at least one of a type of the plurality of action modes, an arrangement order of the plurality of action modes, a flight trajectory of each of the plurality of action modes, a composition rule for the each of the plurality (Continued)

of action modes, or a flight duration of the each of the plurality of action modes.

20 Claims, 20 Drawing Sheets

Related U.S. Application Data continuation of application No. PCT/CN2017/083488, filed on May 8, 2017.

(51) Int. Cl.
*G05D 1/00* (2006.01)
*H04N 23/62* (2023.01)
*H04N 23/66* (2023.01)
*H04N 23/667* (2023.01)
*B64U 101/30* (2023.01)

(52) U.S. Cl.
CPC .......... *H04N 23/66* (2023.01); *H04N 23/667* (2023.01); *B64U 2101/30* (2023.01)

(56) References Cited

FOREIGN PATENT DOCUMENTS

| | | |
|---|---|---|
| CN | 2927771 A1 | 10/2015 |
| CN | 105245846 A | 1/2016 |
| CN | 105391939 A | 3/2016 |
| CN | 105676866 A | 6/2016 |
| CN | 105700544 A | 6/2016 |
| CN | 105744231 A | 7/2016 |
| CN | 105783594 A | 7/2016 |
| CN | 106227224 A | 12/2016 |
| CN | 205891273 U | 1/2017 |
| CN | 106372618 A | 2/2017 |
| CN | 106527492 A | 3/2017 |

UNMANNED AERIAL VEHICLE IMAGING CONTROL METHOD, UNMANNED AERIAL VEHICLE IMAGING METHOD, CONTROL TERMINAL, UNMANNED AERIAL VEHICLE CONTROL DEVICE, AND UNMANNED AERIAL VEHICLE

CROSS-REFERENCE TO RELATED APPLICATION

This application is a continuation of U.S. application Ser. No. 16/677,655, filed on Nov. 7, 2019, which is a continuation of International Application No. PCT/CN2017/083488, filed on May 8, 2017, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of aerial photography and, more particularly, to an unmanned aerial vehicle imaging control method, an unmanned aerial vehicle imaging method, a control terminal, an unmanned aerial vehicle control device, and an unmanned aerial vehicle.

BACKGROUND

Currently, an unmanned aerial vehicle ("UAV") can be provided with an imaging device. A UAV user may realize aerial photography through remotely controlling the UAV, which may provide new imaging angle for the user, regardless of whether the photography is for portrait photography or landscape photography.

However, in conventional UAV imaging methods, a remote controller is typically used to manually control the flight path of the UAV. When the user captures photos and videos, the user need to adjust the imaging position and angle, and capture the images frame by frame. This type of imaging method involves complex operations, which need improvement.

SUMMARY

In accordance with an aspect of the present disclosure, there is provided an imaging control method for an unmanned aerial vehicle ("UAV") that includes determining a combined action mode to be used when the UAV performs imaging, the combined action mode comprising at least two action modes. The imaging control method also includes generating a combined operation instruction based on the combined action mode. The imaging control method further includes transmitting the combined operation instruction to the UAV to enable the UAV to fly based on the combined operation instruction and to capture a video.

In accordance with another aspect of the present disclosure, there is provided an imaging method for an unmanned aerial vehicle ("UAV"). The imaging method includes receiving a combined operation instruction. The imaging method also includes flying, by the UAV, based on the combined operation instruction and according to at least two action modes to capture a video.

In accordance with another aspect of the present disclosure, there is provided an unmanned aerial vehicle ("UAV"). The UAV includes a UAV control device. The UAV control device includes a storage device configured to store an executable instruction. The UAV control device also includes a processor configured to execute the executable instruction stored in the storage device. The executable instruction, when executed by the processor, is configured to cause the processor to: receive a combined operation instruction; and control, based on the combined operation instruction, the UAV to fly based on at least two action modes and to capture a video.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
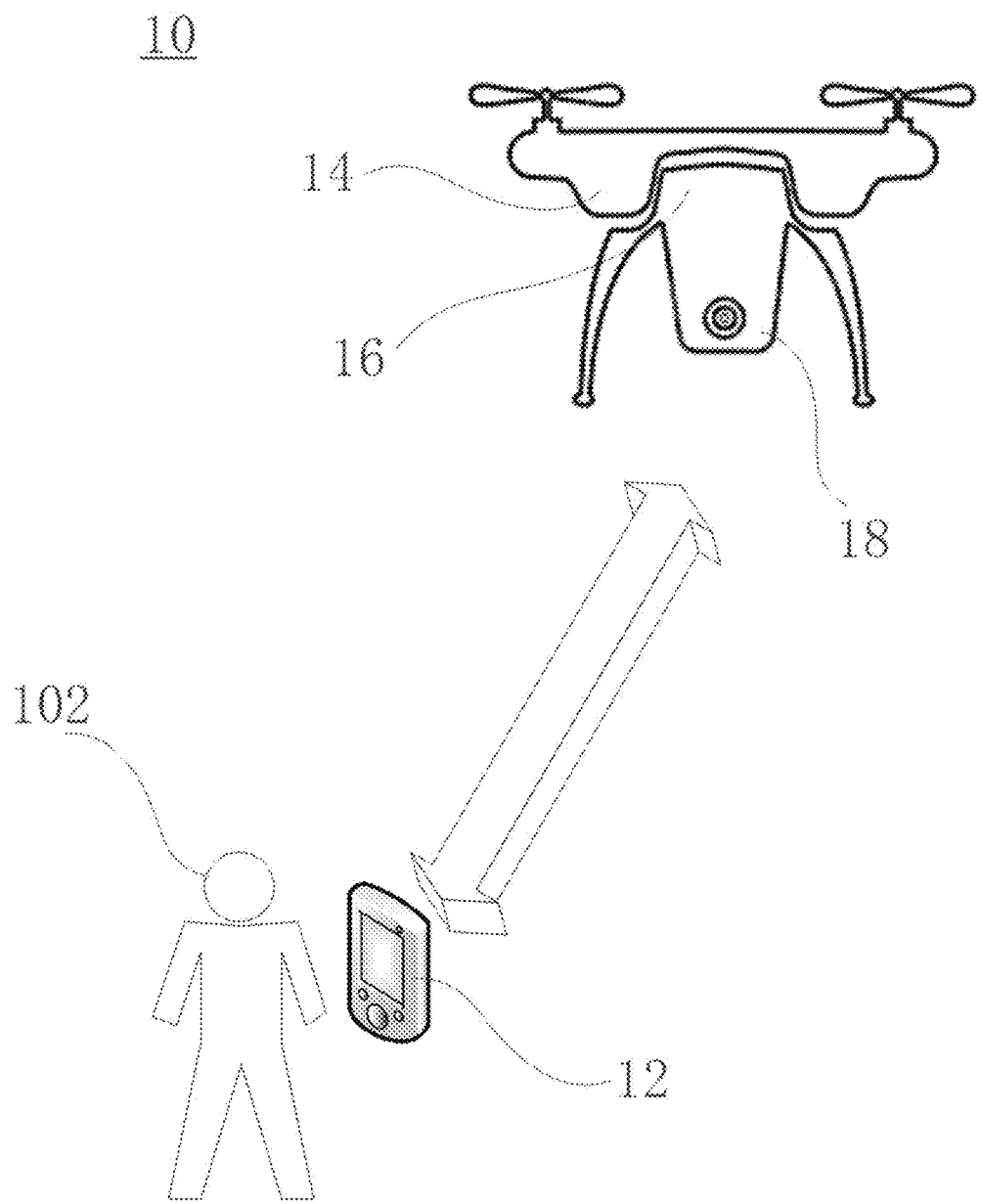
FIG. 1 is a schematic illustration of an application scene of UAV imaging, according to an example embodiment.

To more clearly illustrate the purpose, technical solution, and advantage of the present disclosure, technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, the term "and/or" may be interpreted as "at least one of." For example, A and/or B can mean at least one of A or B. The term "communicatively couple(d)" or "communicatively connect(ed)" indicates that related items are coupled or connected through a communication channel, such as a wired or wireless communication channel. The term "unit" or "module" may include a hardware component, a software component, or a combination thereof.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

In this description, unless otherwise defined, the expression of "UAV flies based on the combined operation instruction" may mean that the UAV and/or a carrier carried by the UAV (e.g., a gimbal) and/or a load operates based on the combined operation instruction.

As shown in FIG. 1, in an embodiment, the present disclosure provides a UAV imaging control system 10, including a control terminal 12 and a UAV 14. The control terminal 12 and the UAV 14 may establish a communication connection, such as a wireless connection. The wireless connection may be used to transmit data between the control terminal 12 and the UAV 14.

In this description, a movable object may be described as the UAV 14. The UAV 14 may include, but not be limited to, unmanned aircraft, unmanned vehicle, unmanned ship or boat, etc. In addition, other types of movable object may also use the disclosed technical solutions.

In some embodiments, the UAV 14 may include a carrier 16 and a load 18. The carrier 16 may enable the load 14 to rotate around one, two, three, or more axes. Optionally or additionally, the carrier 16 may enable the load 18 to linearly move along one, two, three, or more axes. The axis for the rotation and the axis for the translation movement may be perpendicular to one another, or may not be perpendicular to one another. In some embodiments, the carrier may be a gimbal, and the load may be an imaging device (e.g., a camera, etc.). The gimbal may control attitude of the camera. The attitude may include, but not be limited to, a pitch angle, a roll angle, and a yaw angle, etc.

In some embodiments, the load 18 may be rigidly carried by or connected with the UAV 14, such that the load 18 may maintain a static state relative to the UAV 14. For example, the carrier 16 connected with the UAV 14 and the load 18 may not allow the load 18 to move relative to the UAV 14. Optionally, in some embodiments, the load 18 may be directly carried by the UAV 14 without a carrier.

In some embodiments, the load 18 may include one or multiple sensors configured to monitor or track one or multiple target objects. The load may include an image capturing device or an imaging device (e.g., a camera, a camcorder, an infrared imaging device, an ultraviolet imaging device, or similar devices), a video capturing device (e.g., a parabolic reflective microphone), an infrared imaging device, etc. Any suitable sensor may be integrated onto the load 18 to capture a visual signal, an audio signal, an electromagnetic signal, or any other desired signals. The sensor may provide static sensing data (e.g., images) or dynamic sensing data (e.g., video). The sensor may continuously capture the sensing data in a real-time manner or a high-frequency manner.

In some embodiments of the present disclosure, a location where the control terminal 12 is located may be far away from the UAV 14, the carrier 16, and/or the load 18. The control terminal 12 may be placed or glued on a supporting platform. Alternatively, the control terminal 12 may be a handheld or wearable device. For example, the control terminal 12 may include a smart phone, a remote controller, a tablet, a laptop, a computer, a watch, a wristband, glasses, a glove, a helmet, a microphone, or any suitable combination thereof.

Figure 2:
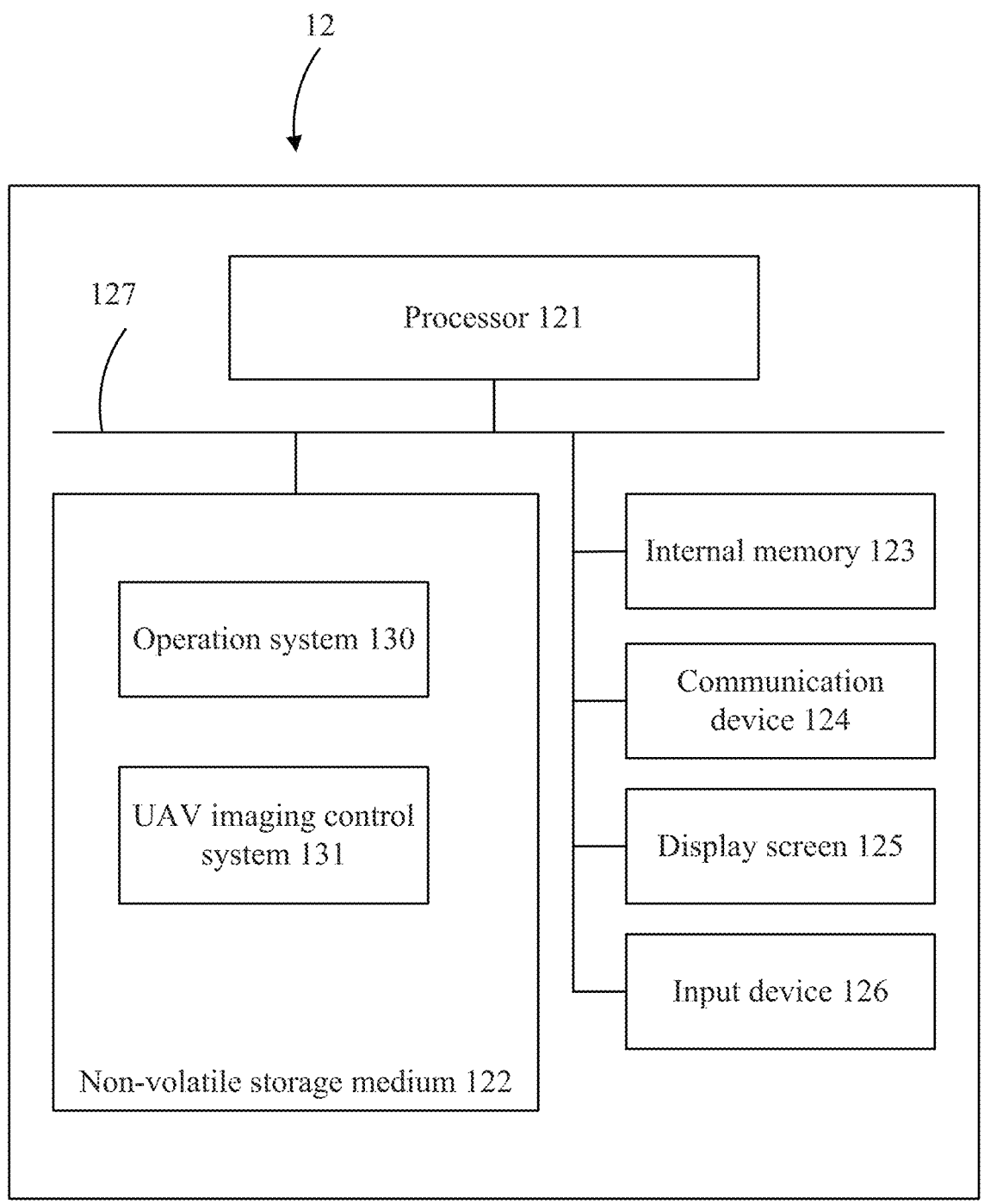
FIG. 2 is a schematic diagram of a structural composition of a control terminal, according to an example embodiment.

As shown in FIG. 2, in an embodiment, the present disclosure provides a control terminal 12, including a processor 121, a non-volatile storage medium 122, an internal memory 123, a communication device 124, a display screen 125, and an input device 126 that are connected via a system bus 127. The processor 121 may have a computing capability and may be configured to control the operations of the control terminal 12. The processor 121 may be configured to execute a UAV imaging control method. Non-volatile storage medium 122 may include at least one of a magnetic storage medium, an optical storage medium, and a flash type storage medium. The non-volatile storage medium 122 may store an operation system 130 and a UAV imaging control system 131. The internal memory 123 may be configured to provide a high speed buffer for the operation system 130 and the UAV imaging control system 131. The communication device 124 may be configured to wirelessly communicate with the UAV 14. The display screen 125 may include at least one of a liquid crystal display screen, a flexible display screen, and an electronic ink display screen. The input device 126 may include at least one of a physical button, a path ball, a touch panel, and a touch layer overlapping the display screen. The touch layer and the display screen 125 may be combined to form a touch screen.

Figure 3:
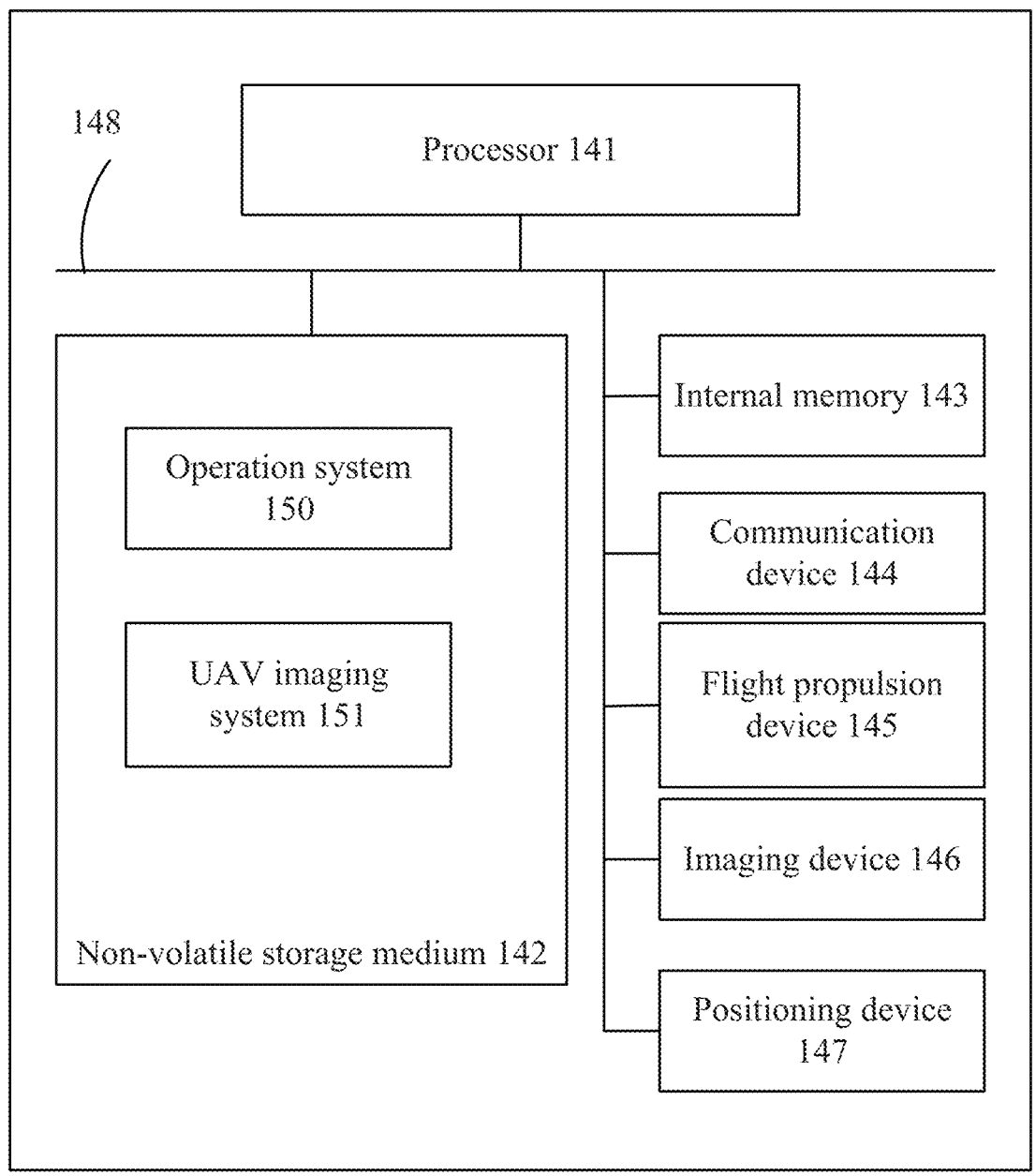
FIG. 3 is a schematic diagram of a structural composition of a UAV, according to an example embodiment.

As shown in FIG. 3, in an embodiment, the present disclosure provides a UAV 14. The UAV 14 may include a processor 141, a non-volatile storage medium 142, an internal memory 143, a communication device 144, a flight propulsion device 145, an imaging device 146, and a positioning device 147 that are connected through a system bus 148. The processor 141 may include a computing capability and may be configured to control the operations of the UAV 14. The processor 141 may be configured to execute a UAV imaging method. The non-volatile storage medium 142 may include at least one of a magnetic storage medium, an optical storage medium, and a flash type storage medium. The non-volatile storage medium 142 may store an operation system 150 and a UAV imaging system 151. The internal memory 143 may provide a high speed buffer for the operation system 150 and the UAV imaging system 151. The communication device 144 may be configured to wirelessly communicate with the control terminal 12. The flight propulsion device 145 may be configured to control UAV flight actions of the UAV 14, such as control the flight velocity and flight direction of the UAV 14 to control the UAV flight actions. For a rotor UAV, the flight propulsion device 145 may include a propeller and a propeller control device (e.g., a motor, an electronic speed control, etc.). The imaging device 146 may be configured to capture images. The captured images may include photos and videos. The positioning device 147 may be a global positioning system ("GPS") positioning device configured to determine a location or position of the UAV 14.

Figure 4:
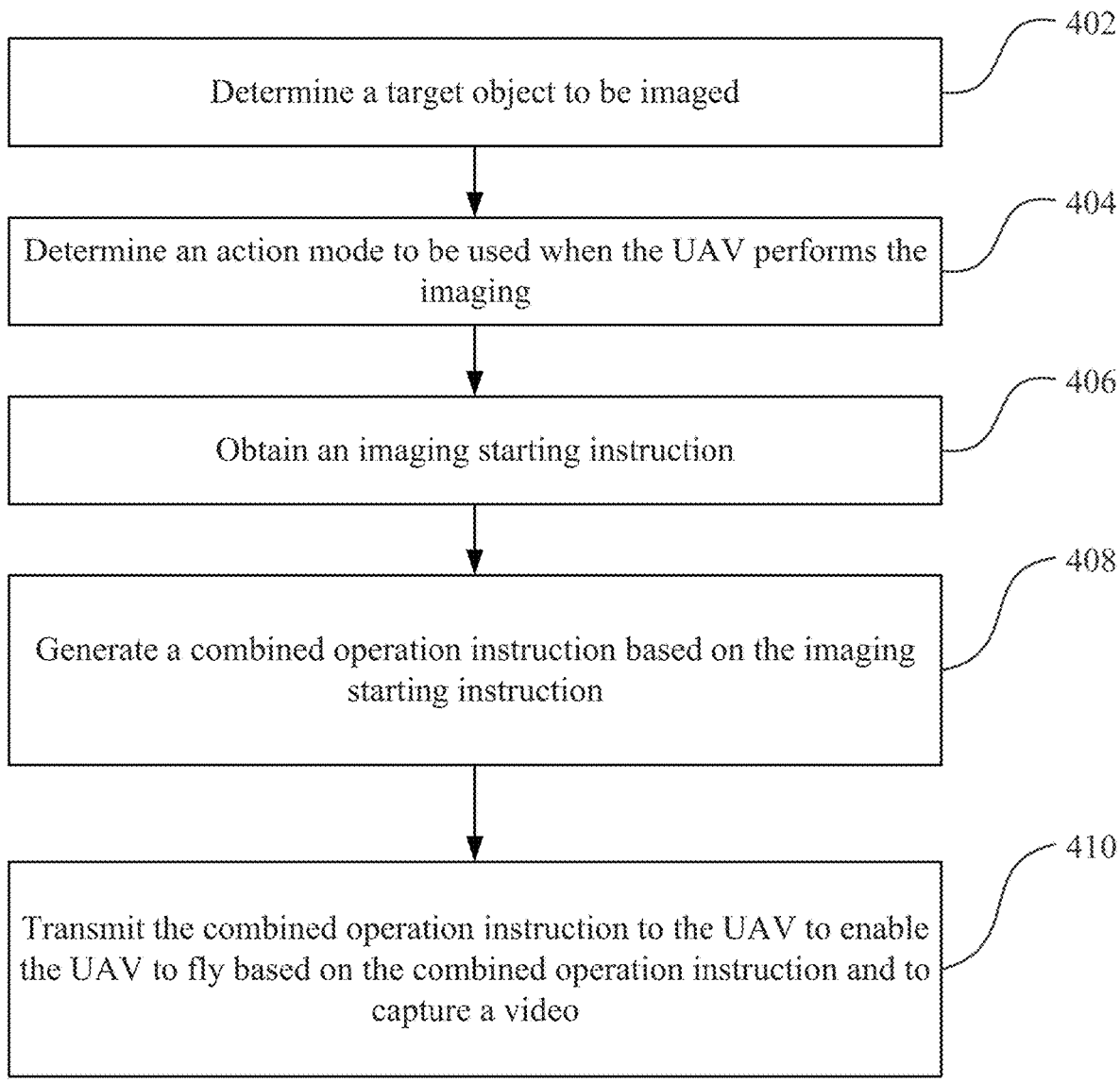
FIG. 4 is a flow chart illustrating a UAV imaging control method, according to an example embodiment.

As shown in FIG. 4, in an embodiment, the present disclosure provides a UAV imaging control method. The method is described based on an example, in which the method is applied to the control terminal 12 shown in FIG. 1 and FIG. 2.

Step 402: determining a target object 102 to be imaged, as shown in FIG. 1.

In various embodiments of the present disclosure, the target object 102 may include a biological object, such as a human or an animal. The target object 102 may also include any natural or man-made object or texture, such as a geological scene (e.g., mountain, plant, valley, lake, river, etc.), a building, a transportation vehicle (e.g., an airplane, a boat, a car, a truck, a bus, a cargo van, or a motorcycle). The target object 102 may be moving or static relative to any suitable reference object. The reference object may be fixed reference object (e.g., the surrounding environment or the earth). Optionally, the reference object may be a moving reference object (e.g., a moving transportation vehicle). In some embodiments, the target object 102 may include a passive target object or an active target object. The active target object may transmit information relating to the target object, such as the GPS location of the target object, to the UAV. The information may be transmitted by a communication unit of the active target object to the communication device of the UAV through a wireless transmission manner. The active target object may be a transportation vehicle, a building, a human, etc. The passive target object may not transmit the information relating to the target object.

In some embodiments, the target object 102 may be determined based on a user input. In an illustrative embodiment, the control terminal 12 may allow a user to input information relating to the target object through any suitable method. In some embodiments, the control terminal 12 may allow the user to directly select a target object from one or multiple images (e.g., photos, videos, or snapshots). For example, the user may use a finger to directly touch the screen to select the target object, or may use a mouse or a joystick to make the selection. The user may draw a line to circle the target object (e.g., through a selection frame, etc.), or touching or selecting the target object on the images. Computer vision or other technologies may be used to recognize a boundary of the target object. One or multiple target objects may be selected at one time. In some embodiments, the selected target object may be displayed using a selection indicator, which may indicate that the user has selected the target object to be tracked. In other embodiments, the control terminal 12 may allow the user to select or input information relating to the target object, such as color, texture, shape, dimension, or other features of the desired target object. For example, the user may input a type information of the target object, or select this type of information through a graphical user interface, or use other methods. In other embodiments, the information relating to the target object may be obtained from a data source, rather than from the user. The data source may include a remote or local data storage unit, other computing device connected with or communicating with the control terminal, etc.

In some embodiments, the target object 102 may be determined based on an automatic recognition. In an illustrative embodiment, the control terminal 12 or the UAV 14 may automatically recognize the target object 102 to be imaged. In an example, the user may, for example, specific descriptive information of the target object 102 to be imaged through a user interface provided by the control terminal 12, such as the type of the target object 102, the geographical coordinates of the target object 102, the dimensions of the target object 102, etc. The control terminal 12 and/or the UAV 14 may automatically recognize the target object 102 to be imaged based on the descriptive information.

In some embodiments, the target object 102 to be imaged may be determined based on obtaining the geographical location information of the target object 102. Specifically, the geographical location information may include information indicating the geographical location, which may be expressed by longitude and latitude, or may be expressed using three-dimensional coordinates in a three-dimensional coordinate system. The control terminal 12 may obtain predetermined geographical location information, for example, obtain input geographical location information as the predetermined geographical location information. The control terminal 12 may receive and display the preview image transmitted from the UAV in real time, and select a geographical location based on an operation of a user on the geographical location shown in the preview image, and obtain selected geographical location information as the predetermined geographical location information. The control terminal 12 may display an electronic map of a region where the UAV is current located, and select the geographical location based on the operation of the user on the electronic map, and obtain the selected geographical location information as the predetermined geographical location information.

In some embodiments, the UAV 14 may obtain the predetermined geographical location information and the geographical location information relating to a location where the UAV is currently located. The UAV 14 may determine a flight path of the UAV based on the two types of geographical location information, and may automatically fly to a location indicated by the predetermined geographical location information. The UAV may fly along a predetermined flight path under the control of a combined operation instruction, and may capture images based on predetermined imaging parameters during the flight.

Step 404: determining an action mode to be used when the UAV performs the imaging.

In this description, the action mode is a manner in which predetermined automatic imaging actions are performed based on predetermined parameters. In an example, the predetermined parameters may include a predetermined flight parameter and/or a predetermined imaging parameter. That is, each action mode may have its own predetermined flight parameter and/or predetermined imaging parameter. In some embodiments, the action mode may be divided based on a flight path. That is, the flight path of each action mode may be different. In some embodiments, the action mode may include an action mode for capturing a close-up of the target object and an action mode for capturing a panoramic view of the environment in which the target object is located. In some embodiments, an action mode may include a stage for capturing a close-up of the target object and a stage for capturing a panoramic view of the environment in which the target object is located.

In some embodiments, the predetermined flight parameter may include a predetermined flight path. The predetermined flight path may be any predetermined usable flight path, such as a closed or non-closed shape on any plane in the space, for example, a closed shape such as a circle or a polygon, or a non-closed shape such as an arc shape, a fold line shape, etc. The predetermined flight path may be a spatial three-dimensional shape such as a spiral shaped path.

In some embodiments, the predetermined imaging parameter may include at least one of a light sensitivity (or referred to as ISO value), an aperture value, an exposure compensation, a shutter speed, a focal length, an autofocus method, a metering method, and a white balance. The autofocus method may include at least one of a distance measurement autofocus method that is based on measuring a distance between the lens of the imaging device and the target object to be imaged, a focus detection autofocus method that is based on the clarity of the captured images. The metering method may include at least one of a spot metering method, a center partial metering method, a center weighted average metering method, an average metering method, and a multi-zone metering method.

FIG. 6-FIG. 10 show illustrative action modes of the present disclosure.

Figure 6:
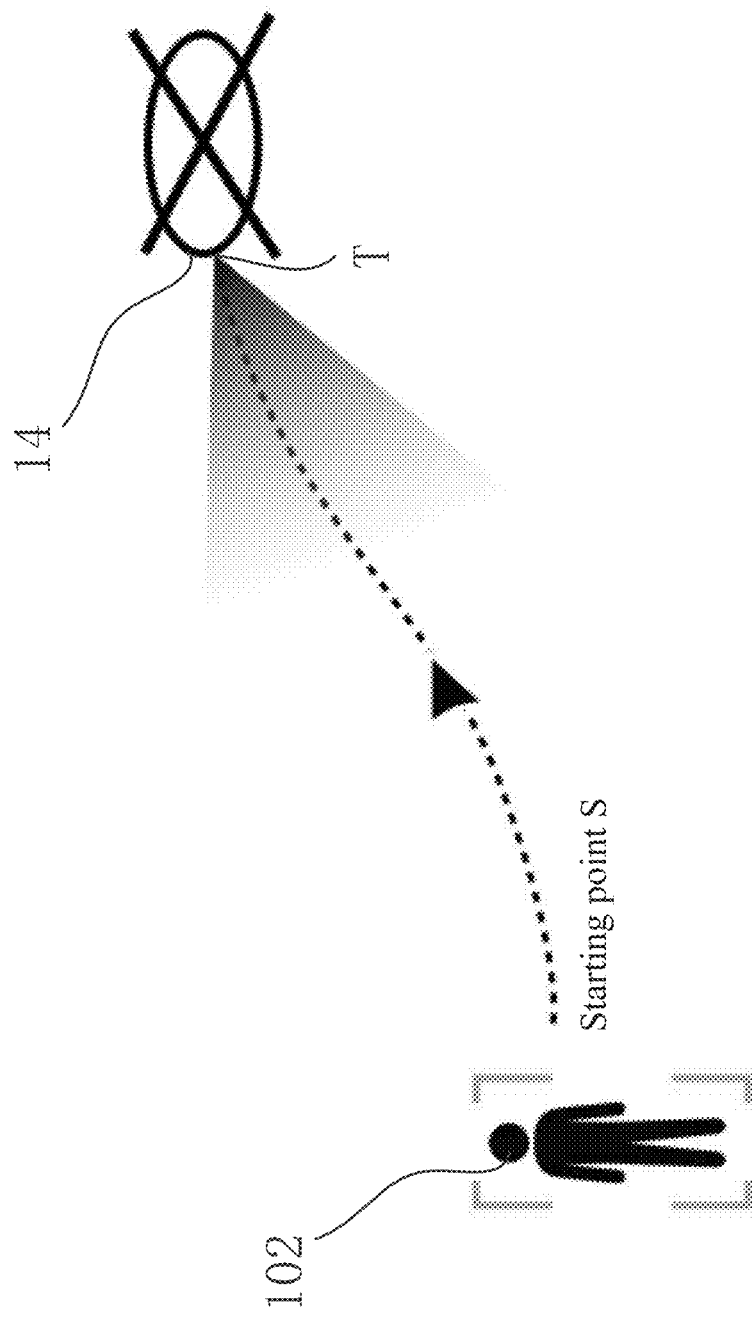
FIG. 6 is a schematic illustration of a backward fly action mode, according to an example embodiment.

In the backward fly mode shown in FIG. 6, the UAV 14 may fly in an oblique upper direction relative to the target object 102. As shown in FIG. 6, the flight path of the UAV 14 may have a substantial S-shaped curve. At the starting point S, the UAV 14 may capture close-ups of the target object 102. At this moment, the close-ups of the target object 102 may be captured based on the predetermined imaging parameter. At the finishing point T, the UAV 14 may capture a panoramic view of the environment in which the target object 102 is located using an overhead shooting method from an oblique above location over the target object 102. At this moment, the panoramic view of the environment in which the target object 102 is located may be captured based on the predetermined imaging parameter. It should be understood, that the predetermined imaging parameter may be an imaging parameter pre-stored for different imaging objects or different imaging scenes.

Figure 7:
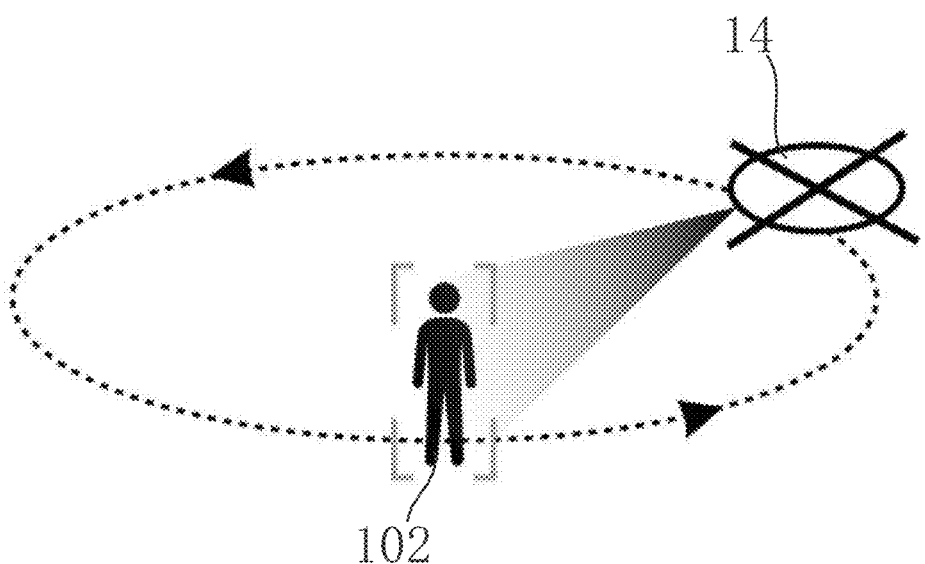
FIG. 7 is a schematic illustration of a circling fly action mode, according to an example embodiment.

In the circling fly mode shown in FIG. 7, the UAV 14 may fly circling around the target object for a complete circle. As shown in FIG. 7, the flight path of the UAV 14 is a substantially circular path. On the entire circular path, the UAV 14 may capture 360° close-ups of the target object 102. At this moment, the close-ups of the target object 102 may be captured based on the predetermined imaging parameter.

Figure 8:
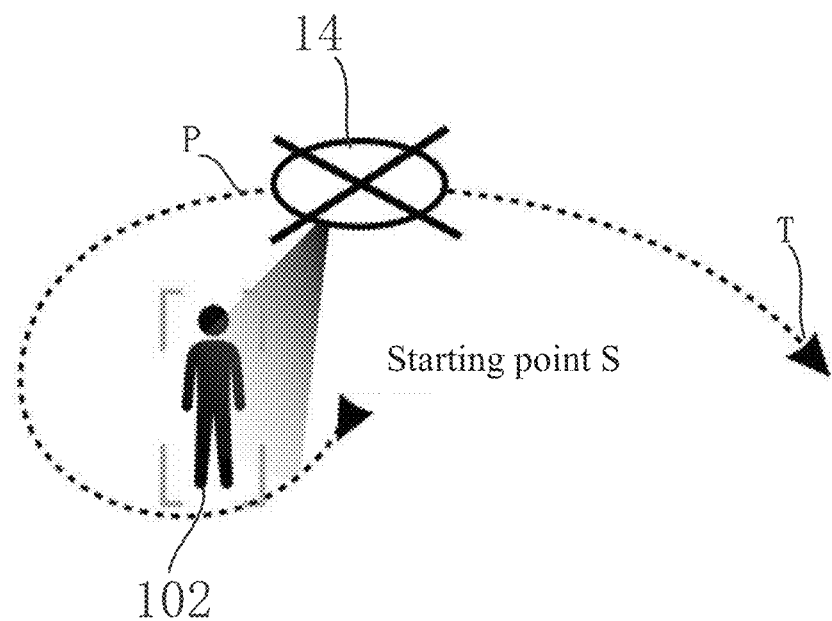
FIG. 8 is a schematic illustration of a spiral fly action mode, according to an example embodiment.

In the spiral fly mode shown in FIG. 8, the UAV 14 may fly outwardly and spirally relative to the target object 102. As shown in FIG. 8, the flight path of the UAV 14 may be a spiral curve. At the starting point S, the UAV 14 may capture the close-ups of the target object 102. At this moment, the close-ups of the target object 102 may be captured based on the predetermined imaging parameter. At a middle point P and the finishing point T, the UAV 14 may capture the panoramic view of the environment in which the target object 102 is located using an overhead shooting method from the front and the back sides of the target object 102, respectively. At this moment, the panoramic view of the environment in which the target object 102 is located may be captured based on the predetermined imaging parameter.

Figure 9:
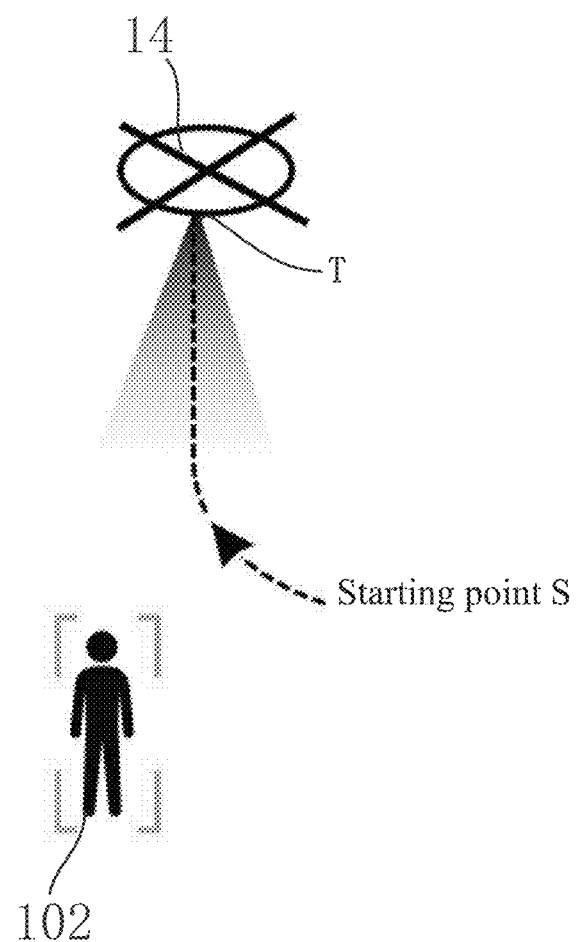
FIG. 9 is a schematic illustration of a soaring fly action mode, according to an example embodiment.

In the soaring mode shown in FIG. 9, the UAV 14 may fly upwardly relative to the target object 102. As shown in FIG. 9, the flight path of the UAV 14 may be a substantially L-shaped curve. Similar to the backward fly mode, at the starting point S, the UAV 14 may capture the close-ups of the target object 102. At this moment, the close-ups of the target object 102 may be captured based on the predetermined imaging parameter. At the finishing point T, the UAV may capture the panoramic view of the environment in which the target object 102 is located based on an overhead shooting method from a location right over the target object 102. As this moment, the panoramic view of the environment in which the target object 102 is located may be captured based on the predetermined imaging parameter.

Figure 10:
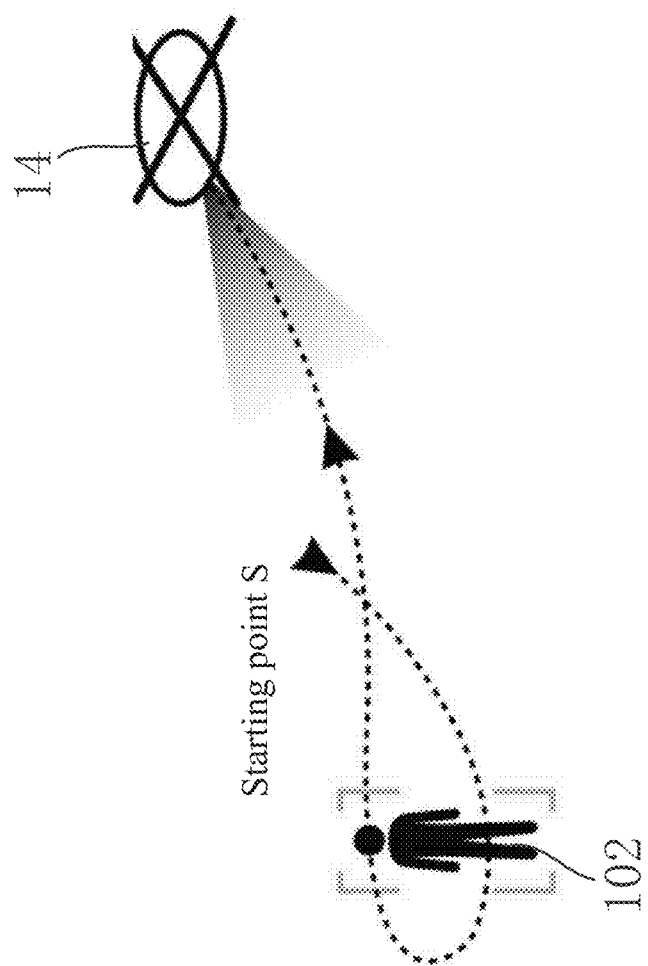
FIG. 10 is a schematic illustration of a comet fly action mode, according to an example embodiment.

In the comet fly mode shown in FIG. 10, the UAV 14 may circle around the target object 102 for a complete circle and then fly outwardly in an oblique upper direction relative to the target object 102. As shown in FIG. 10, the flight path of the UAV 14 is similar to the flight path of a comet. At the initial stage, the UAV 14 may capture the 360° close-ups of the target object 102. At this moment, the close-ups of the target object 102 may be captured based on the predetermined imaging parameter. At the finishing stage, the UAV 14 may capture the panoramic view of the environment in which the target object 102 is located using the overhead shooting method from a location that is at the oblique upper direction of the target object 102. At this moment, the panoramic view of the environment in which the target object 102 is located may be captured based on the predetermined imaging parameter.

In some embodiments, each action mode may have its own predetermined composition rule. That is, the action mode may be associated with a predetermined composition rule. The composition rule may ensure that the target object is located at a predetermined composition location in the associated action mode.

Figure 11:
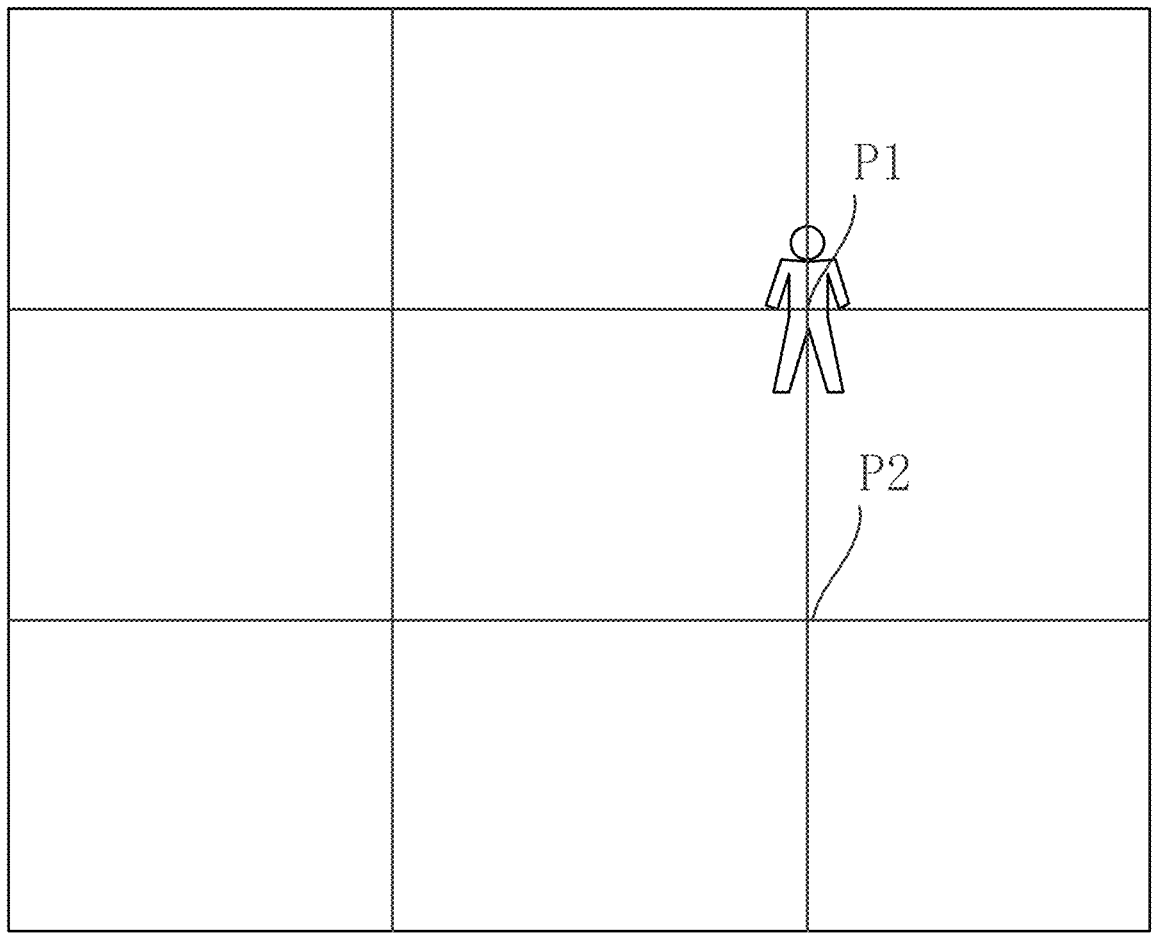
FIG. 11 is a schematic illustration of composition rules, according to an example embodiment.

In some embodiments, the composition rule may include: (1) nine square composition rule, in which the target object is placed on the locations corresponding to the crossing points of the nine equal squares. As shown in FIG. 11, the four crossing points of a Chinese character " 井 " are the predetermined composition locations for the target object. Typically, the crossing point P1 at the upper right direction is the most frequently used. The next frequently used is the crossing point P2 at the lower right direction. (2) rule of thirds composition rule, in which the shooting screen is divided into three equal parts. For example, when landscape is to be imaged, ⅓ is selected to place the sky or ⅓ is selected to place the ground. The screen ratio of 1:2 may highlight the part that needs to be emphasized. For example, if the sky is beautiful, most the sky elements can be reserved. The overall screen appears to be more harmonic. (3) dichotomy composition rule, in which the screen is divided into two equal parts. For example, when capturing images of a landscape, one half may be occupied by sky and one half may be occupied by the ground. (4) centripetal composition rule, in which the target object is placed at the center location, and the surrounding scenes and objects are arranged in a radiation shape, to highlight and emphasize the target object. (5) symmetric composition rule, in which the captured image is left-right symmetric or up-down symmetric. It should be understood that the above composition rules are only illustrative. The present disclosure is not limited to the above composition rules. Other composition rules may also be used.

In some embodiments, an action mode may include its own predetermined flight path and composition rule. That is, the action mode, flight path, and composition rule may have a one-to-one correspondence. For example, in the backward fly mode, the predetermined flight path may be an S-shaped flight path toward an oblique upper direction relative to the target object. The composition rule may be the rule of thirds. As such, when the action mode for the imaging is determined to be the backward fly mode, the corresponding flight path and the composition rule are also determined.

In some embodiments, multiple action modes (e.g., at least two action modes) may be combined and determined as the action mode for imaging. The combination of the multiple action modes may include types of the action modes, an arrangement order of the selected multiple action modes, a time duration of each of the selected action modes. The combination of the multiple action modes may be determined based on the relative location relationship between the environment in which the target object 102 is located, the target object 102, and the UAV 14.

In other embodiments, a single action mode may be determined as the action mode for imaging.

Figure 12:
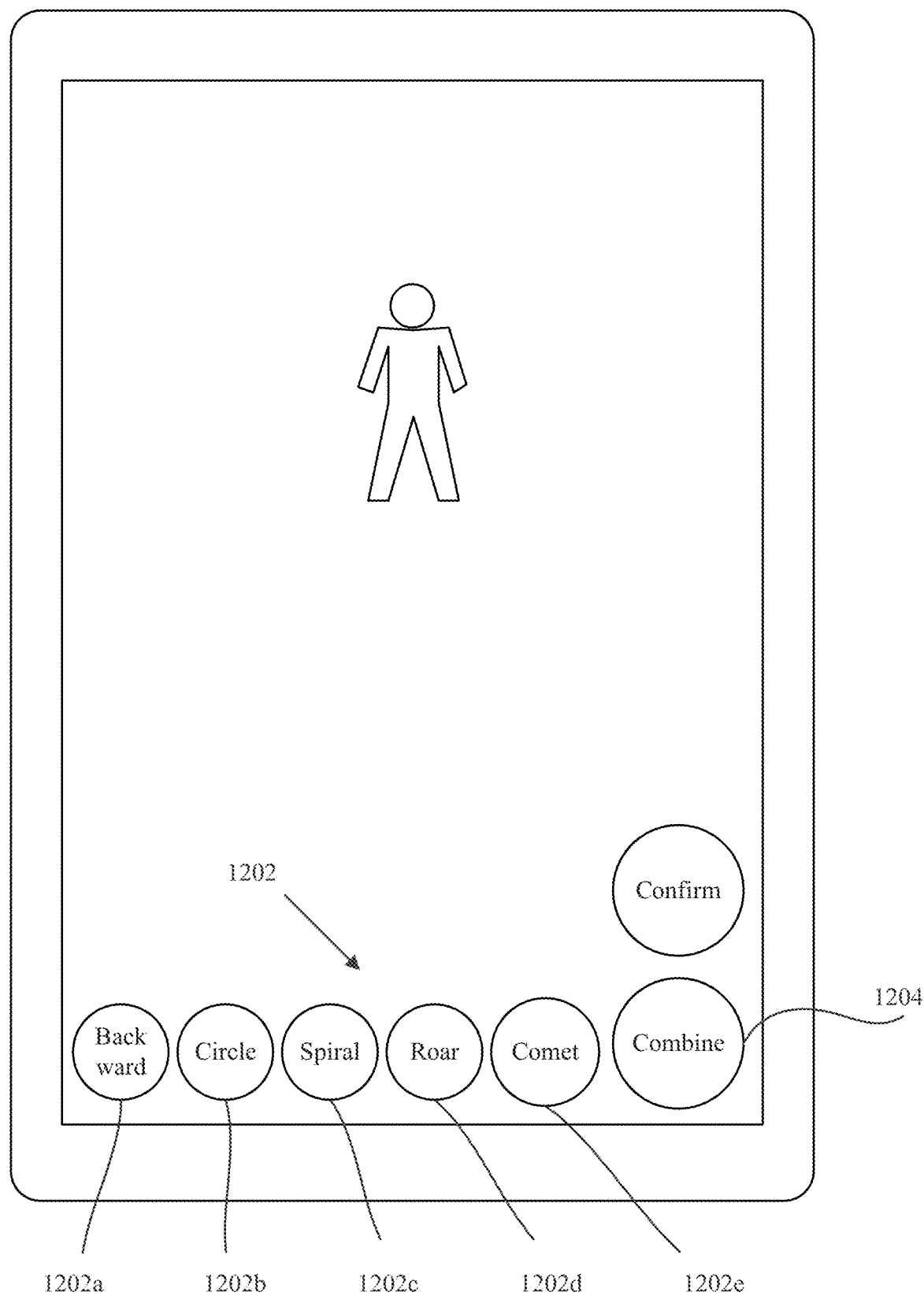
FIG. 12 is a schematic illustration of an action mode display interface displayed by the control terminal, according to an example embodiment.

In some embodiments, the user may select one or multiple action modes as the action mode(s) to be used for imaging. In an illustrative embodiment, as shown in FIG. 12, the control terminal 12 may provide options for multiple predetermined action modes. The user may use any suitable method to select one or multiple predetermined action modes, and may determine the selected one or multiple action modes as the action mode(s) to be used for imaging.

For example, after the control terminal 12 starts the imaging application, the control terminal 12 may display the UAV imaging control interface shown in FIG. 12. In the UAV imaging control interface, multiple (e.g., 5) predetermined action mode options 1202 may be displayed. The options may include: a backward fly mode option 1202*a*, a circling fly mode option 1202*b*, a spiral fly mode option 1202*c*, a roaring fly mode option 1202*d*, and a comet fly mode option 1202*e*. The user may click the option 1202*a* and click "Confirm" to determine the backward fly mode as the action mode to be used for imaging. When the user clicks the option 1202*b* and clicks the "Confirm," the circling fly mode may be determined as the action mode to be used for imaging. When the user clicks the option 1202*c* and clicks the "Confirm," the spiral fly mode may be determined as the action mode to be used for imaging. When the user clicks the option 1202*d* and clicks "Confirm," the roaring fly mode may be determined as the action mode to be used for imaging. When the user clicks the option 1202*e* and clicks "Confirm," the comet fly mode may be determined as the action mode to be used for imaging.

Figure 13:
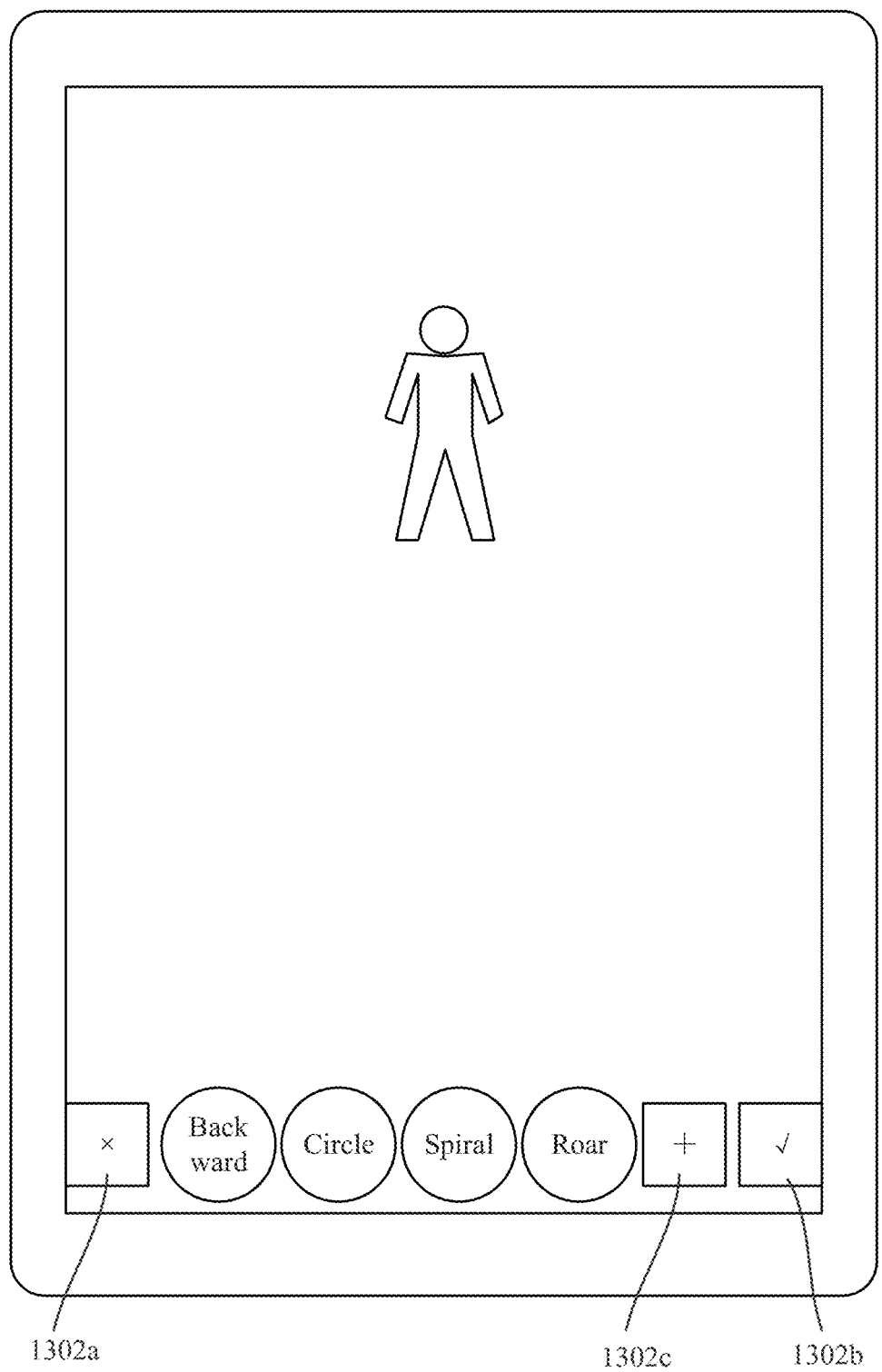
FIG. 13 is a schematic illustration of an action mode selection interface displayed by the control terminal, according to an example embodiment.

In some embodiments, in the UAV imaging control interface, a "Combine" option 1204 may be displayed, as shown in FIG. 12. The user may click the option 1204, and an action modes combination interface may pop out, as shown in FIG. 13. In the action modes combination interface, the user may freely combine multiple action modes. The free combination may include selecting types of the action modes, selecting the arrangement order of the selected multiple action modes, and selecting the time duration of each of the selected action modes, etc. For example, the user may click an option 1302*c* to increase the action modes, click an option 1302*a* to delete an action mode, click an option 1302*b* to determine the selected action mode(s), thereby determining a combination of multiple action modes as the combined action mode to be used for imaging.

In some embodiments, the control terminal 12 may automatically determine one or multiple action modes as the action mode to be used for imaging. In an illustrative embodiment, the control terminal 12 may select a default action mode as the action mode to be used for imaging. In another illustrative embodiment, the control terminal 12 may select the action mode used in the last imaging to be the action mode to be used for the current imaging. In some illustrative embodiments, the control terminal 12 may determine the action mode to be used for imaging based on the relative location relationship between the environment in which the target object 102 is located, the target object 102, and the UAV 14.

Step 406: obtaining an imaging starting instruction.

In some embodiments, the control terminal 12 may run an imaging application program. The imaging application program may be an application program of the system itself, or may be a third-party application program. Various steps of the UAV imaging control method may be realized through the imaging application program. For example, the control terminal 12 may detect a predetermined event, and may obtain the imaging starting instruction when detecting the predetermined event (e.g., an event such as clicking a start button). In an embodiment, the control terminal 12 may detect the predetermined event and start timing when detecting the predetermined event. When the time duration reaches a predetermined time duration, the imaging starting instruction may be obtained.

In an illustrative embodiment, the control terminal 12 may display an imaging starting control element, and may detect an operation on the imaging starting control element to obtain the corresponding imaging starting instruction. For example, the control terminal may display an imaging starting control element 102 in the imaging interface of the UAV shown in FIG. 5. The user may click the imaging starting control element 102 to trigger the imaging starting instruction. The operation on the imaging starting control element may include at least one of a cursor clicking operation, a touch clicking operation, and a gesture operation.

In an embodiment, the control terminal may detect a shake of the body of the control terminal. When detecting the shake, the corresponding imaging starting instruction may be obtained. In an embodiment, the control terminal may detect a voice command input to obtain the imaging starting instruction in the voice form.

Step 408: generating a combined operation instruction associated with the determined one or multiple action modes based on the imaging starting instruction.

In some embodiments, the combined operation instruction may include multiple operation instructions. The multiple operation instructions may respectively one-on-one correspond to the determined multiple action modes. Specifically, each action mode may have its own flight parameter (e.g., a flight path) and imaging parameter. That is, each action mode may be associated with a predetermined flight parameter (e.g., a flight path) and the imaging parameter. In some embodiments, after the control terminal 12 obtains the imaging starting instruction, the control terminal 12 may retrieve, e.g., from the control terminal 12, the predetermined flight parameter (e.g., the flight path) and the imaging parameter associated with the determined multiple action modes, to generate the combined operation instruction. The combined operation instruction may be configured to trigger a series of ordered and combined actions of the UAV to achieve automatic imaging.

In some embodiments, the control terminal 12 may periodically examine whether a server has an operation instruction associated with a predetermined action mode. If there is such an operation instruction, the control terminal 12 may download the updated operation instruction to update a local predetermined operation instruction associated with a predetermined action mode. In another embodiment, the periodical examination may be replaced with performing the examination when detecting an operation for updating the combined operation instruction triggered by the user.

In some embodiments, when receiving the operations instruction updating notification transmitted by the server, the control terminal 12 may download an updated operations instruction from the server to update the local predetermined operations instruction associated with the predetermined action mode.

Step 410: transmitting the combined operation instruction to the UAV to enable the UAV to fly based on the combined operation instruction and to capture a video.

In some embodiments, the control terminal 12 may transmit the combined operation instruction to the UAV 14 through the wireless connection with the UAV 14. The wireless connection may use a wireless local area network connection method, such as Wi-Fi (e.g., 2.4 GHz or 5.8 GHz frequency band, etc.) connection or WAPI connection, or may use an ordinary radio connection. After the UAV 14 receives the combined operation instruction transmitted by the control terminal 12, the UAV 14 may execute a series of actions configured by the combined operation instruction to accomplish the automatic imaging task (e.g., video capturing).

In some embodiments, the multiple action modes may include a first action mode and a second action mode. Transmitting the combined operation instruction to enable the UAV to fly based on the combined operation instruction and to capture videos may include: capturing a first video based on the first action mode; capturing a second video based on the second action mode; synthesize the first video and the second video to generate the video.

In some embodiments, the control terminal 12 may transmit the combined operation instruction to the UAV 14, to enable the UAV 14 to fly based on the predetermined flight parameter and/or to capture videos based on the predetermined imaging parameter. In some embodiments, the combined operation instruction enables the UAV 14 to fly along the predetermined flight path. For example, when the user selects the backward fly mode and the circling fly mode, i.e., determines that the backward fly mode and the circling fly mode are the action modes to be used for imaging, the combined operation instruction may include a flight path of the backward fly mode and a flight path of the circling fly mode. After the combined operation instruction is transmitted, the UAV 14 is enabled to fly along the flight path of the backward fly mode (i.e., fly in an oblique upper direction) and along the flight path of the circling fly mode (i.e., circling the target object for a complete circle), in order to capture a combination of videos of the target object.

In some embodiments, a series of actions may include at least one of an action for adjusting the flight parameter of the UAV and an action for adjusting the imaging parameter.

In some embodiments, the action for adjusting the flight parameter of the UAV may include at least one of an action for adjusting the flight path of the UAV, an action for adjusting the flight velocity of the UAV, an action for adjusting the flight direction of the UAV, an action for adjusting the flight height of the UAV, a UAV hover action, a UAV rolling action, and a UAV side movement action.

In some embodiments, the action for adjusting the imaging parameter may include at least one of adjusting the light sensitivity (also referred to as the ISO value), aperture value, exposure compensation, shutter speed, focal length, autofocus method, metering method, and white balance. The autofocus method may include a distance measurement autofocus method that is based on measuring the distance between the lens of the imaging device and the target object, and a focus detection autofocus method that is based on the clarity of the captured images. The metering method may include at least one of a spot metering method, a center partial metering method, a center weighted average metering method, an average metering method, and a multi-zone metering method. The action for adjusting the imaging parameter may include an action for adjusting an imaging field of view, such as a translation or zoom of the imaging field of view. The imaging field of view refers to the range of the space to be imaged by the imaging device of the UAV.

According to the UAV imaging control method of the present disclosure, a combined operation instruction associated with one or multiple predetermined action modes may be automatically retrieved and transmitted to the UAV. The UAV may orderly execute a series of actions based on the combined operation instruction to capture images. As such, the user only needs to select the predetermined action modes and trigger the imaging starting instruction to control the UAV to automatically accomplish a combined action mode. The disclosed method not only simplifies operations, and improves the convenience of operations, but also renders the captured videos to be continuous and smooth, which reduces the time for the late stage video processing.ad In some embodiments, the action for adjusting the imaging parameter may include adjusting the imaging parameter based on a composition rule associated with the determined one or multiple predetermined action modes, such that the target object is located at a predetermined composition location. For example, when the backward fly mode is determined to be the action mode to be used for imaging, the imaging parameter may be adjusted based on the rule of thirds composition rule associated with the backward fly mode, such that when the UAV flies in an oblique upper direction relative to the target object, the target object is always located at the predetermined composition location determined based on the rule of thirds composition rule. When the backward fly mode and the roaring fly mode are determined to be the action modes to be used for imaging, the imaging parameter may be adjusted based on the rule of thirds composition rule and the centripetal composition rule associated with the backward fly mode and the roaring fly mode, such that when the UAV flies in the oblique upper direction and flies upward relative to the target object, the target object is always at the predetermined composition location determined based on the rule of thirds composition rule and the centripetal composition rule.

In the above UAV imaging control method, the action mode may be associated with the target object. The disclosed method may ensure that the target object is always at the predetermined composition location while accomplishing the flight actions, thereby improving the quality of the captured videos.

Figure 5:
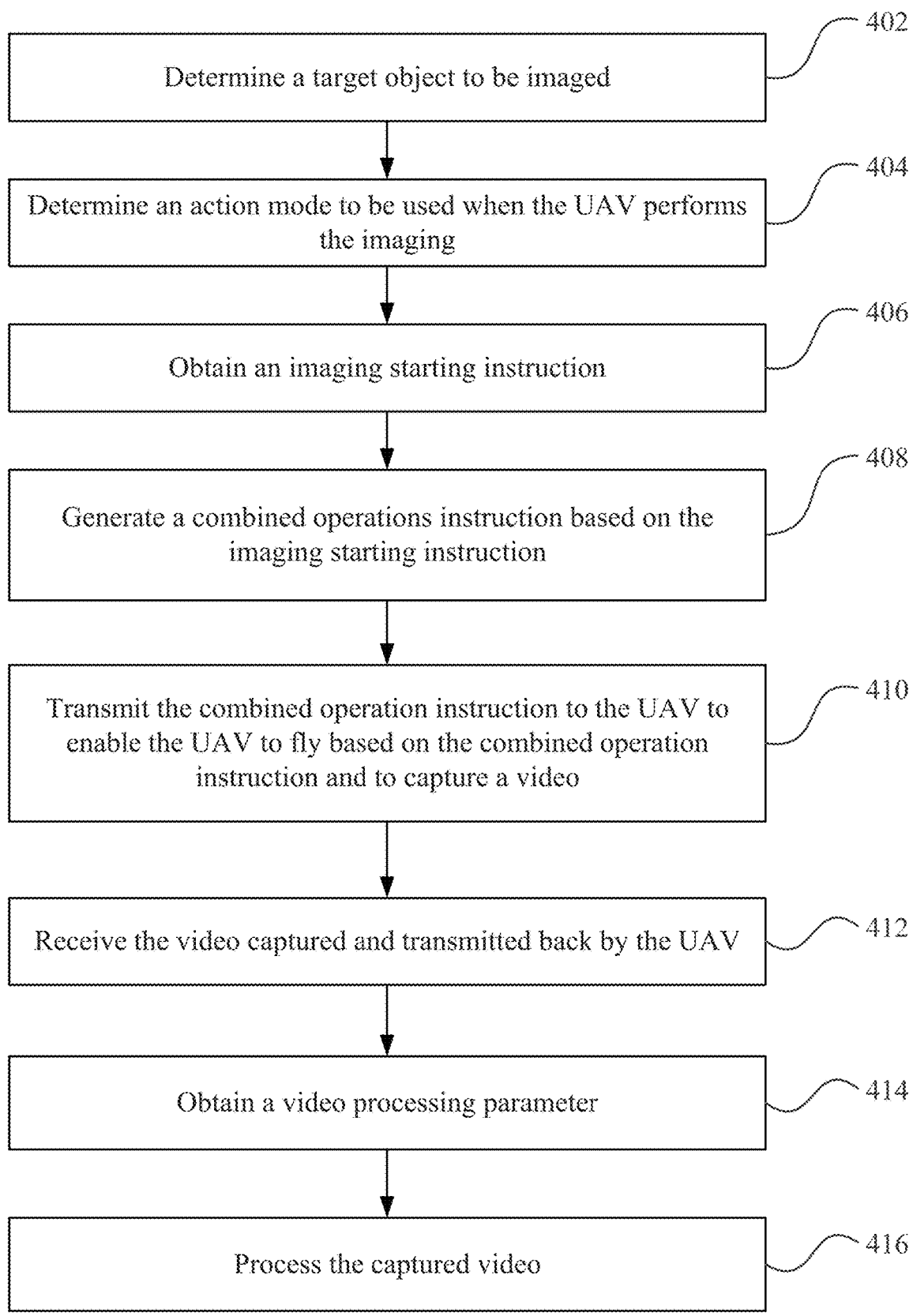
FIG. 5 is a flow chart illustrating a UAV imaging control method, according to another example embodiment.

As shown in FIG. 5, in some embodiments, the UAV imaging control method may also include step 412: receiving the video captured and transmitted back (e.g., returned) by the UAV. In an illustrative embodiment, the UAV may transmit the capture videos to the control terminal in real time through a wireless connection. The control terminal may receive the videos returned by the UAV.

In some embodiments, the UAV imaging control method may include step 416: processing the captured video.

In an illustrative embodiment, the processing may include: acceleratively processing at least a segment of the captured video. For example, the captured video may include at least three segments, at least one of which at the middle may be acceleratively processed to obtain a video having a "slow-fast-slow" effect. For example, for a video captured under the backward fly mode, the captured video may be divided into a starting stage, a middle stage, and a finishing stage. At the starting stage, close-up views of the target object may be captured. At the finishing stage, panoramic views of the environment in which the target object is located may be captured. At the middle stage, transitional views of the target object from the close-up views of the target object to the panoramic views of the environment in which the target object is located may be captured. After acceleratively processing the middle stage, the close-up views of the target object at the starting stage and the panoramic views of the environment in which the target object is located may be highlighted.

In some embodiments, the accelerative processing may include frame decimation processing of the video (or down sampling by extracting frames from the video). Specifically, as shown in FIG. 13, for a captured video having a time duration of 60 seconds, for example, the normal recording speed may be 30 frames/second. Thus, the video having a time duration of 60 seconds has 1800 frames in total. The video may be divided into three segments. A segment having a time duration of 3 seconds may be the starting stage. A segment having a time duration of 54 seconds may be the middle stage. Another segment having a time duration of 3 seconds may be the finishing stage. The middle stage may be acceleratively processed, such that the time duration of the middle stage may be reduced to 6 seconds. When processing the video, the processing may start from the 3-second time instance. A frame may be extracted at every 0.3 second, until the processing reaches the 57-second time instance. Then normal speed is restored. Through this processing method, a short video having a time duration of 12 seconds and having the "slow-fast-slow" effect may be obtained, which may be suitable for sharing at social media platforms.

In some embodiments, the UAV imaging method may also include step 414: obtaining a video processing parameter. In an embodiment, the video processing parameter may include the number of segments the video is to be divided, a time duration of each segment of the video, and/or the acceleration multiple, etc. The video processing parameter may be a pre-stored default video processing parameter, a video processing parameter input by a user, or a video processing parameter determined by the control terminal based on the action mode and the social media platform where the video will be shared.

As such, in the UAV imaging control method of the present disclosure, the captured video may be directly processed, and does not need to be output to late stage video editing software, which simplifies the video processing procedure, and improves the convenience of transmitting the captured video through the social media platform.

Figure 14:
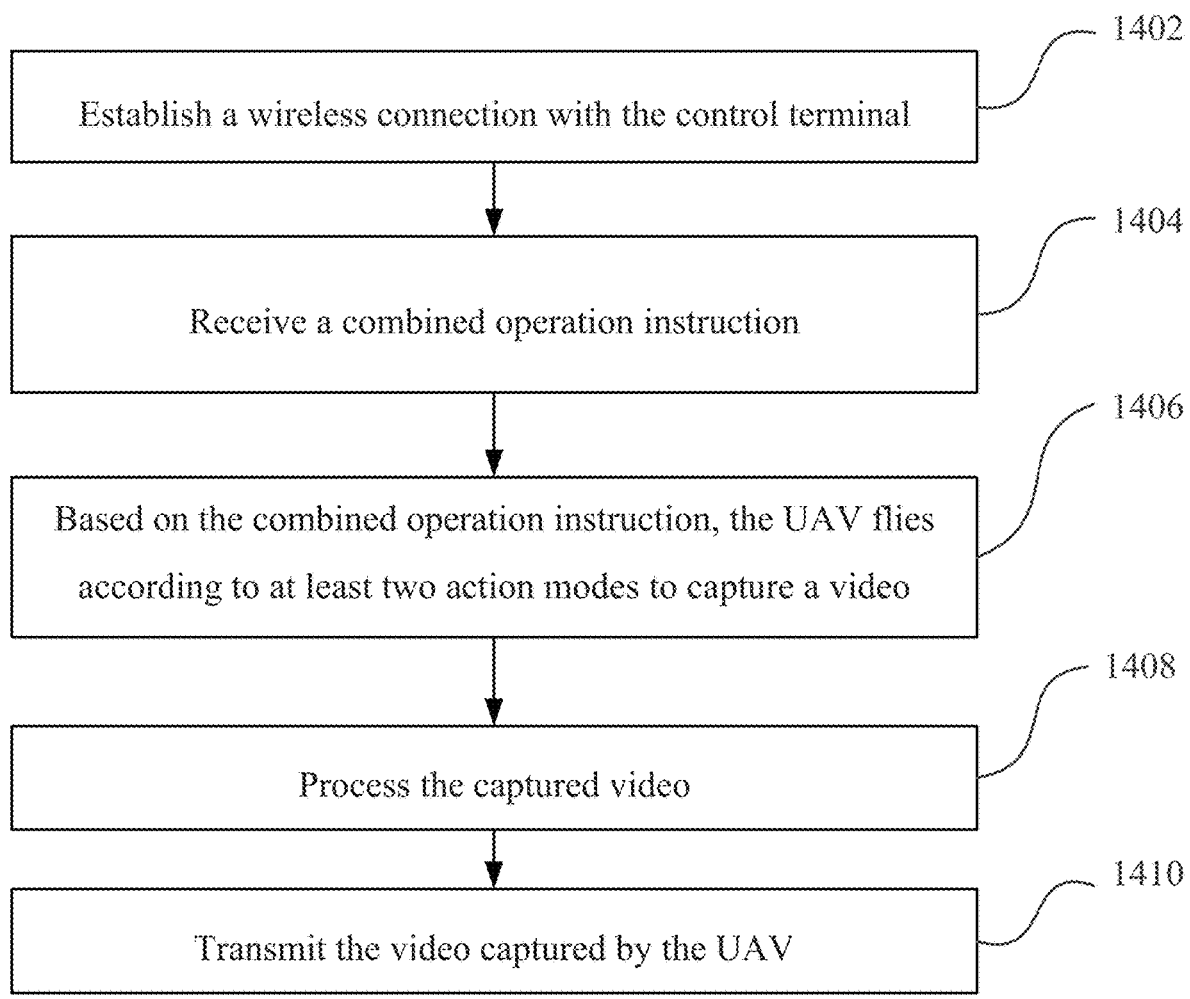
FIG. 14 is a flow chart illustrating a UAV imaging method, according to an example embodiment.

According to another embodiment of the present disclosure, an imaging method for the UAV is provided. As shown in FIG. 14, the imaging method of the UAV will be explained using an example in which the imaging method is applied to the UAV 14 shown in FIG. 1 and FIG. 3.

Step 1402: establishing a wireless connection with the control terminal.

In some embodiments, the UAV 14 may actively or passively establish a wireless connection with the control terminal 12. The wireless connection may include a wireless local area network connection, such as a Wi-Fi connection or a WAPI connection, or may include an ordinary radio connection.

Step 1404: receiving a combined operation instruction.

In some embodiments, the combined operation instruction may be associated with one or multiple action modes. In some embodiments, the combined operation instruction may include multiple operations instructions. The multiple operations instructions may correspond one-on-one with the determined multiple action modes. Specifically, each action mode may have its own flight parameter (e.g., flight path)

and imaging parameter. That is, each action mode may be associated with a predetermined flight parameter (e.g., flight path) and imaging parameter. The combined operation instruction may be configured to trigger a series of ordered combined actions of the UAV to accomplish automatic imaging.

In some embodiments, the UAV 14 may receive the combined operation instruction, and may fly according to the predetermined flight parameter and/or capture videos according to the predetermined imaging parameter. In some embodiments, the combined operation instruction may enable the UAV 14 to fly along the predetermined flight path. For example, when the user selects the backward fly mode and the circling fly mode, i.e., when the user determines that the backward fly mode and the circling fly mode are the action modes to be used for imaging, the combined operation instruction may include the flight path of the backward fly mode and the flight path of the circling fly mode. After transmitting the combined operation instruction, the UAV 14 may receive the instruction and fly according to the flight path of the backward fly mode (i.e., fly in an oblique upper direction) and according to the flight path of the circling fly mode (i.e., circle the target object for a complete circle), to capture a combined video of the target object.

Step 1406: based on the combined operation instruction, the UAV flying according to at least two action modes to capture videos.

In some embodiments, the UAV flying based on at least two action modes may include the UAV executing a series of actions. In some embodiments, the series of actions may include at least one of an action for adjusting the flight parameter of the UAV and an action for adjusting the imaging parameter of the UAV.

In some embodiments, the at least two action modes may include a first action mode and a second action mode. Based on the combined operation instruction, the UAV flying based on at least two action modes to capture videos may include: capturing a first video based on the first action mode; capturing a second video based on the second action mode; and synthesizing the first video and the second video to generate the video.

In some embodiments, the action for adjusting the flight parameter of the UAV may include at least one of an action for adjusting the flight path of the UAV, an action for adjusting a flight velocity of the UAV, an action for adjusting the flight direction of the UAV, an action for adjusting the flight height of the UAV, a UAV hover action, a UAV rolling action, and a UAV side movement action. The action for adjusting the imaging parameter may include an action for adjusting an imaging field of view, such as a translation or zoom of the imaging field of view. The imaging field of view refers to the range of the space to be imaged by the imaging device of the UAV.

In some embodiments, the action for adjusting the imaging parameter may include adjusting at least one of a light sensitivity (or referred to as ISO value), an aperture value, an exposure compensation, a shutter speed, a focal length, an autofocus method, a metering method, and a white balance. The autofocus method may include at least one of a distance measurement autofocus method that is based on measuring a distance between the lens of the imaging device and the target object to be imaged, a focus detection autofocus method that is based on the clarity of the captured images. The metering method may include at least one of a spot metering method, a center partial metering method, a center weighted average metering method, an average metering method, and a multi-zone metering method.

According to the UAV imaging method of the present disclosure, the UAV may orderly execute a series of actions based on a combined operation instruction to capture images. As such, the user only need to select the predetermined action modes and trigger the imaging starting instruction to control the UAV to automatically accomplish a combined action mode. The disclosed method not only simplifies operations, and improves the convenience of operations, but also renders the captured videos to be continuous and smooth, which reduces the time for the late stage video processing.

In some embodiments, the action for adjusting the imaging parameter may include adjusting the imaging parameter based on a composition rule associated with the determined one or multiple predetermined action modes, such that the target object is located at a predetermined composition location. For example, when the backward fly mode is determined to be the action mode to be used for imaging, the imaging parameter may be adjusted based on the rule of thirds composition rule associated with the backward fly mode, such that when the UAV flies in an oblique upper direction relative to the target object, the target object is always located at the predetermined composition location determined based on the rule of thirds composition rule. When the backward fly mode and the roaring fly mode are determined to be the action modes to be used for imaging, the imaging parameter may be adjusted based on the rule of thirds composition rule and the centripetal composition rule associated with the backward fly mode and the roaring fly mode, such that when the UAV flies in the oblique upper direction and flies upward relative to the target object, the target object is always at the predetermined composition location determined based on the rule of thirds composition rule and the centripetal composition rule.

In the above UAV imaging method, the action mode may be associated with the target object. The disclosed method may ensure that the target object is always at the predetermined composition location while accomplishing the flight actions, thereby improving the quality of the captured videos.

In some embodiments, the UAV imaging method may also include step 1410: transmitting the video captured by the UAV. In an illustrative embodiment, the UAV may transmit the captured video to the control terminal in real time through the wireless connection. The control terminal may receive the video returned by the UAV.

In some embodiments, the UAV imaging method may include step 1408: processing the captured video.

In an illustrative embodiment, the processing may include: acceleratively processing at least a segment of the captured video. For example, the captured video may include at least three segments, at least one of which at the middle may be acceleratively processed to obtain a video having a "slow-fast-slow" effect. For example, for a video captured under the backward fly mode, the captured video may be divided into a starting stage, a middle stage, and a finishing stage. At the starting stage, close-up views of the target object may be captured. At the finishing stage, panoramic views of the environment in which the target object is located may be captured. At the middle stage, transitional views of the target object from the close-up views of the target object to the panoramic views of the environment in which the target object is located may be captured. After acceleratively processing the middle stage, the close-up views of the target object at the starting stage and the panoramic views of the environment in which the target object is located may be highlighted.

Figure 15:
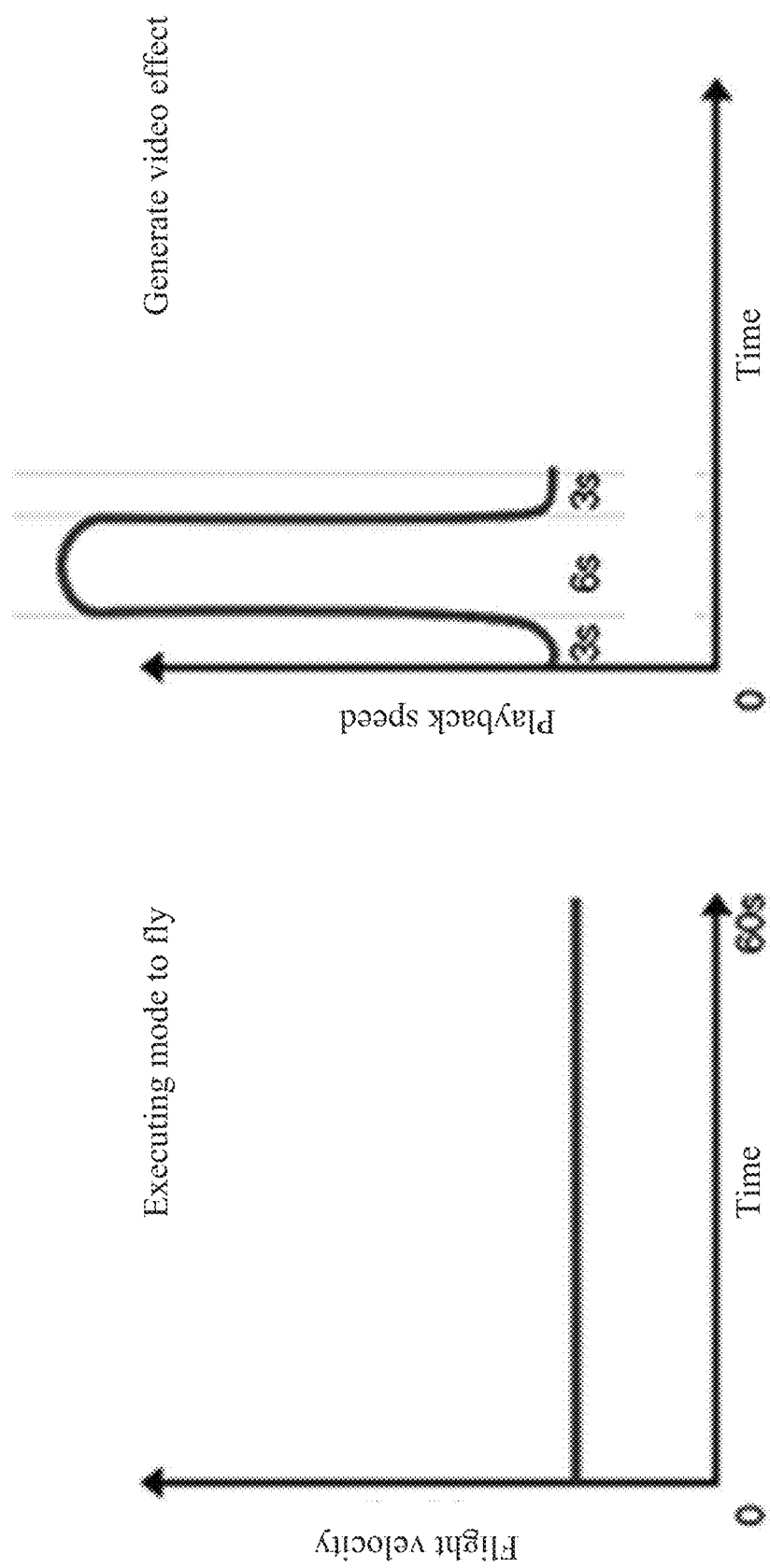
FIG. 15 is a schematic illustration of steps for acceleratingly process a video, according to an example embodiment.

In some embodiments, the accelerative processing may include frame decimation processing of the video (or down sampling by extracting frames from the video). Specifically, as shown in FIG. 15, for a captured video having a time duration of 60 seconds, for example, the normal recording speed may be 30 frames/second. Thus, the video having a time duration of 60 seconds has 1800 frames in total. The video may be divided into three segments. A segment having a time duration of 3 seconds may be the starting stage. A segment having a time duration of 54 seconds may be the middle stage. Another segment having a time duration of 3 seconds may be the finishing stage. The middle stage may be acceleratively processed, such that the time duration of the middle stage may be reduced to 6 seconds. When processing the video, the processing may start from the 3-second time instance. A frame may be extracted at every 0.3 second, until the processing reaches the 57-second time instance. Then normal speed is restored. Through this processing method, a short video having a time duration of 12 seconds and having the "slow-fast-slow" effect may be obtained, which may be suitable for sharing at social media platforms.

In some embodiments, the UAV imaging method may also include a step of: obtaining a video processing parameter. In an embodiment, the video processing parameter may include the number of segments the video is to be divided, a time duration of each segment of the video, and/or the acceleration multiple, etc. The video processing parameter may be a pre-stored default video processing parameter, a video processing parameter input by a user, or a video processing parameter determined by the UAV based on the pro-action mode and the social media platform where the video will be shared.

As such, in the UAV imaging method of the present disclosure, the captured video may be directly processed, and does not need to be output to late stage video editing software, which simplifies the video processing procedure, and improves the convenience of transmitting the captured video through the social media platform.

According to another embodiment of the present disclosure, a control terminal is provided. The control terminal may include: a storage device configured to store executable instructions; and a processor configured to execute the executable instructions stored in the storage device, to execute the UAV imaging control method described in any of the embodiments of the present disclosure.

Figure 16:
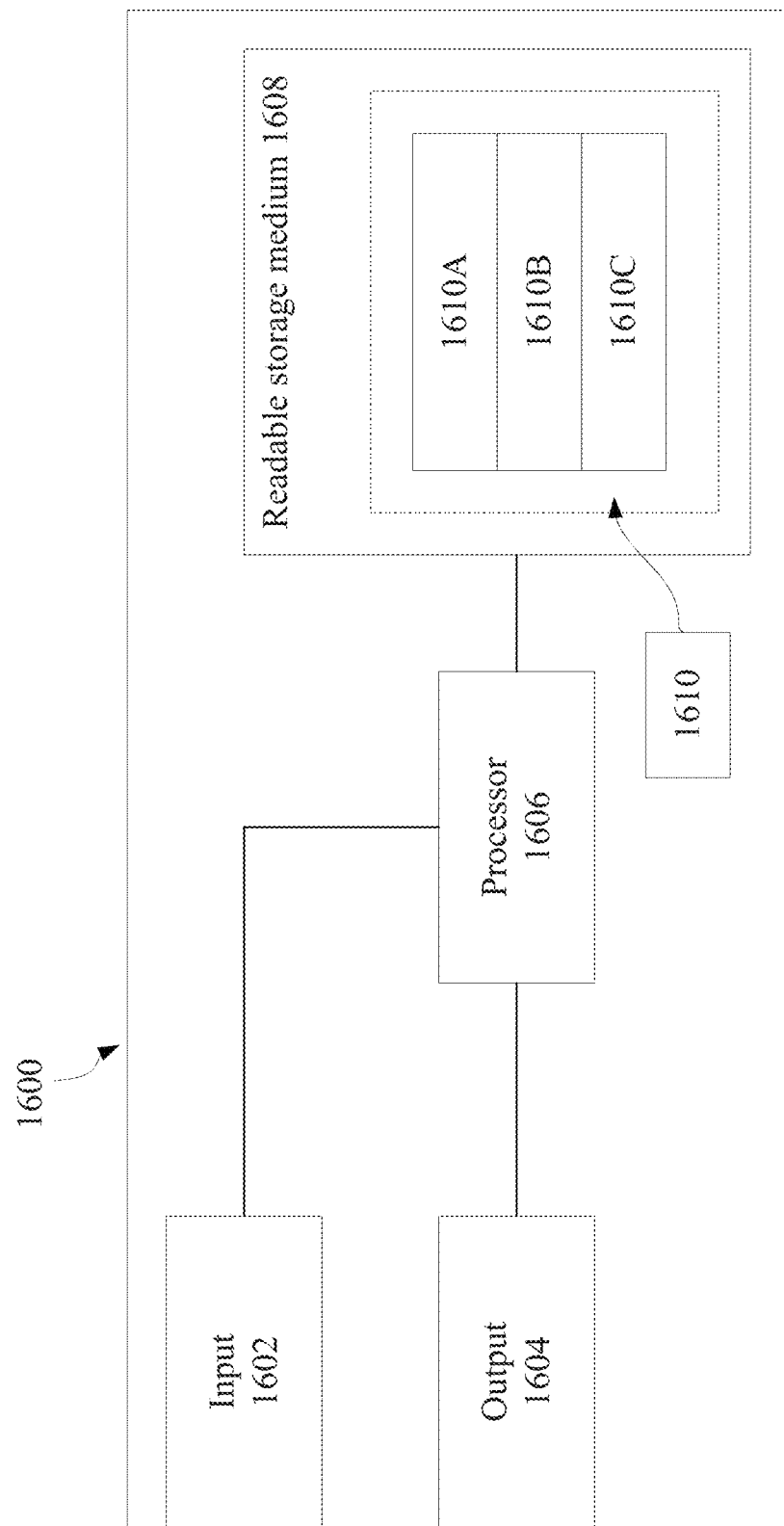
FIG. 16 is a schematic diagram of an example hardware configuration of a control terminal, according to an example embodiment.

FIG. 16 illustrates a schematic diagram of an example hardware configuration 1600 of the control terminal. The hardware configuration 1600 may include a processor 1606 (e.g., a microprocessor ("μP"), a digital signal processor ("DSP"), etc.). The processor 1606 may be a single processing unit or multiple processing units configured to execute various steps of the method described above. The hardware configuration 1600 may also include an input unit 1602 configured to receive signals from other entities, and an output unit 1604 configured to provide signals to other entities. The input unit 1602 and the output unit 1604 may be configured as a single entity or separate entities.

In addition, the hardware configuration 1600 may include at least one readable storage medium 1608 that may be in the form of a non-volatile memory or a volatile memory, such as an electrically erasable programmable read only memory ("EEPROM"), a flash memory, and/or a hard disk drive. The readable storage medium 1608 may include a computer program 1610. The computer program 1610 may include codes/computer-readable instructions, which when executed by the processor 1606 of the hardware configuration 1600, cause the hardware configuration 1600 and/or a device including the hardware configuration 1600 to execute the above-described methods and their variations.

The computer program instructions 1610 may be configured as computer program instructions codes having, for example, computer program instructions modules 1610A~1610C. For example, the codes of the computer program instructions of the hardware configuration 1600 may include: a module 1610A configured to determine the combined action mode to be used for UAV imaging. The combined action mode may include at least two action modes. The codes of the computer program instruction may also include: a module 1610B configured to generate a combined operation instruction based on the combined action mode. The codes of the computer program instruction may also include: a module 1610C configured to transmit the combined operation instruction to the UAV, to enable the UAV to fly based on the combined operation instruction to capture videos.

Although the coding manners in the embodiment shown in FIG. 16 are realized as computer program modules, which when executed by the processor 1606, cause the hardware configuration 1600 to execute the above-described methods, in other embodiments, at least one of the coding manners may be at least partially realized as a hardware circuit.

The processor may be a single central processing unit ("CPU"), or may include two or more processing units. For example, the processor may include a general purpose microprocessor, an instruction set processor, and/or a related chip assembly, and/or a dedicated microprocessor (e.g., an application specific integrated circuit ("ASIC")). The processor may also include an on-board storage device configured for buffering purpose. The computer program may be carried by a computer program product connected with the processor. The computer program product may include a computer-readable storage medium storing the computer program. For example, the computer program product may be a flash memory, a random access memory ("RAM"), a read only memory ("ROM"), an electrically erasable programmable read only memory ("EEPROM"). In some embodiments, the computer program modules may be distributed to different computer program products in the form of a memory in the user equipment ("UE").

In some embodiments, the control terminal may include one of a smart phone, a remote controller, a tablet, a laptop, a computer, glasses, a glove, and a microphone.

In an embodiment of the present disclosure, a UAV control device is provided. The UAV control device may include: a storage device configured to store executable instructions; and a processor configured to execute the executable instructions stored in the storage device to execute the UAV imaging method described in any of the above embodiments.

Figure 17:
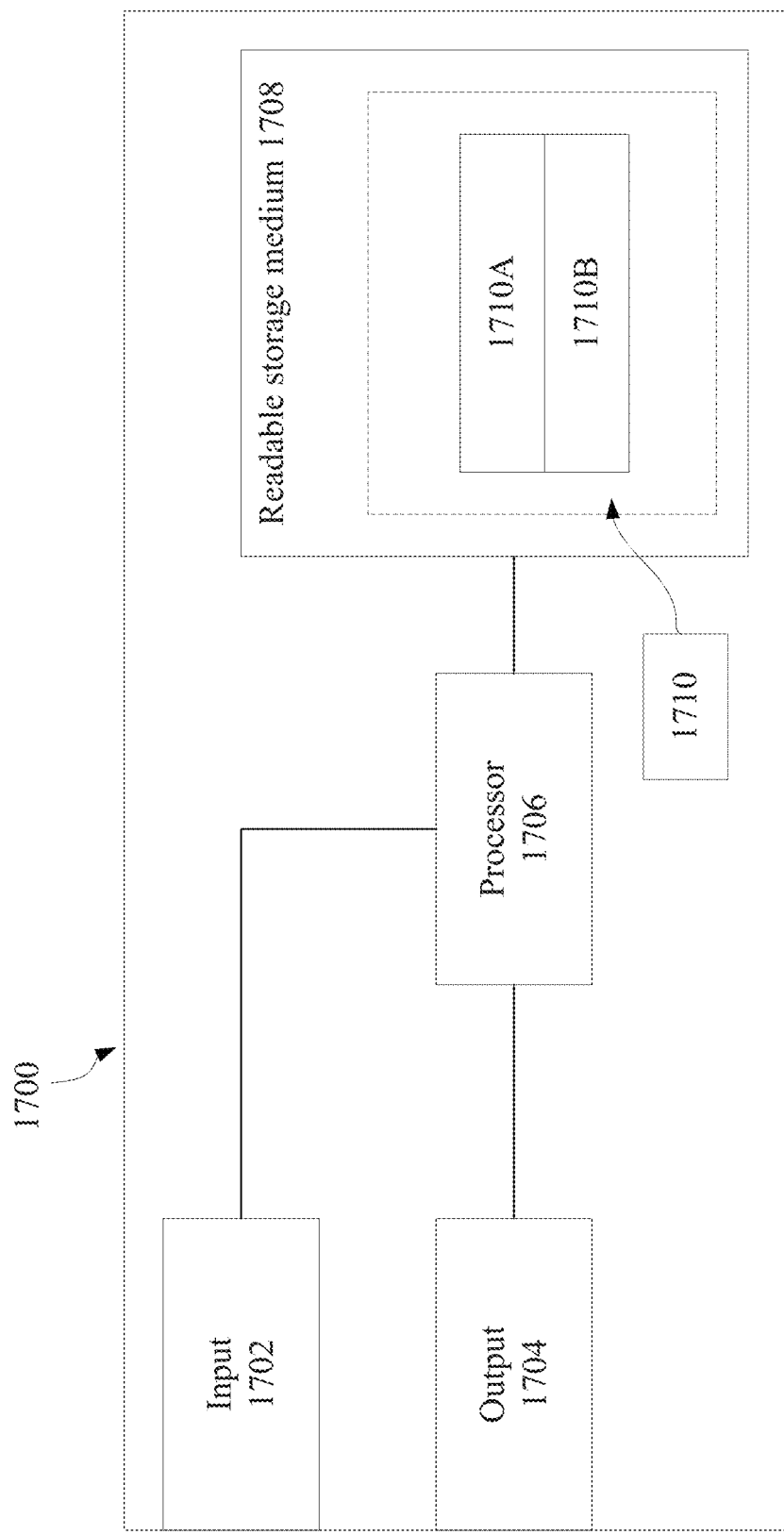
FIG. 17 is a schematic diagram of an example hardware configuration of a UAV control device, according to an example embodiment.

FIG. 17 is a schematic diagram of an example hardware configuration 1700 of the UAV control device. The hardware configuration 1700 may include a processor 1706 (e.g., a microprocessor ("μP"), a digital signal processor ("DSP"), etc.). The processor 1706 may be a single processing unit or multiple processing units configured to execute various steps of the method described above. The hardware configuration 1700 may also include an input unit 1702 configured to receive signals from other entities, and an output unit 1704 configured to provide signals to other entities. The input unit 1702 and the output unit 1704 may be configured as a single entity or separate entities.

In addition, the hardware configuration 1700 may include at least one readable storage medium 1708 that may be in the form of a non-volatile memory or a volatile memory, such as an electrically erasable programmable read only memory ("EEPROM"), a flash memory, and/or a hard disk drive. The readable storage medium 1708 may include a computer program 1710. The computer program 1710 may include codes/computer-readable instructions, which when executed by the processor 1706 of the hardware configuration 1700, cause the hardware configuration 1700 and/or a device including the hardware configuration 1700 to execute the above-described methods and their variations.

The computer program instructions 1710 may be configured as computer program instructions codes having, for example, computer program instructions modules 1710A~1710C. For example, the codes of the computer program instructions of the hardware configuration 1700 may include: a module 1710A configured to receive the combined action mode. The codes of the computer program instruction may also include: a module 1710B configured to control the UAV to fly according to at least two action modes and to capture videos based on the combined operation instruction.

Although the coding manners in the embodiment shown in FIG. 17 are realized as computer program modules, which when executed by the processor 1706, cause the hardware configuration 1700 to execute the above-described methods, in other embodiments, at least one of the coding manners may be at least partially realized as a hardware circuit.

The processor may be a single central processing unit ("CPU"), or may include two or more processing units. For example, the processor may include a general purpose microprocessor, an instruction set processor, and/or a related chip assembly, and/or a dedicated microprocessor (e.g., an application specific integrated circuit ("ASIC")). The processor may also include an on-board storage device configured for buffering purpose. The computer program may be carried by a computer program product connected with the processor. The computer program product may include a computer-readable storage medium storing the computer program. For example, the computer program product may be a flash memory, a random access memory ("RAM"), a read only memory ("ROM"), an electrically erasable programmable read only memory ("EEPROM"). In some embodiments, the computer program modules may be distributed to different computer program products in the form of a memory in the user equipment ("UE").

Figure 18:
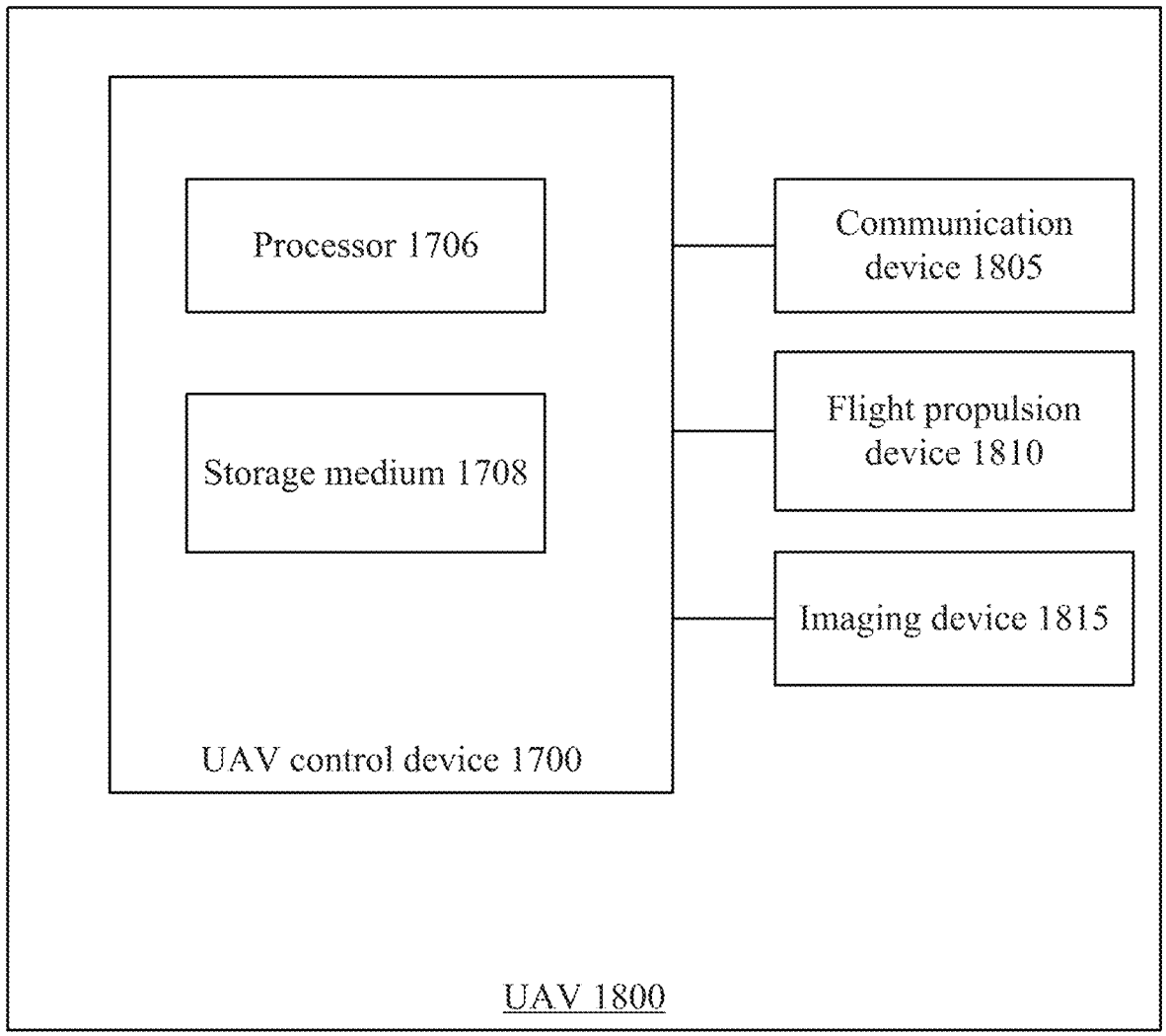
FIG. 18 is a schematic diagram of a UAV, according to an example embodiment.

As shown in FIG. 18, an embodiment of the present disclosure provides a UAV 1800. The UAV 1800 may include the above-described UAV control device 1700.

In some embodiments, the UAV 1800 may include a communication device 1805, a flight propulsion device 1810, and an imaging device 1815.

Figure 19:
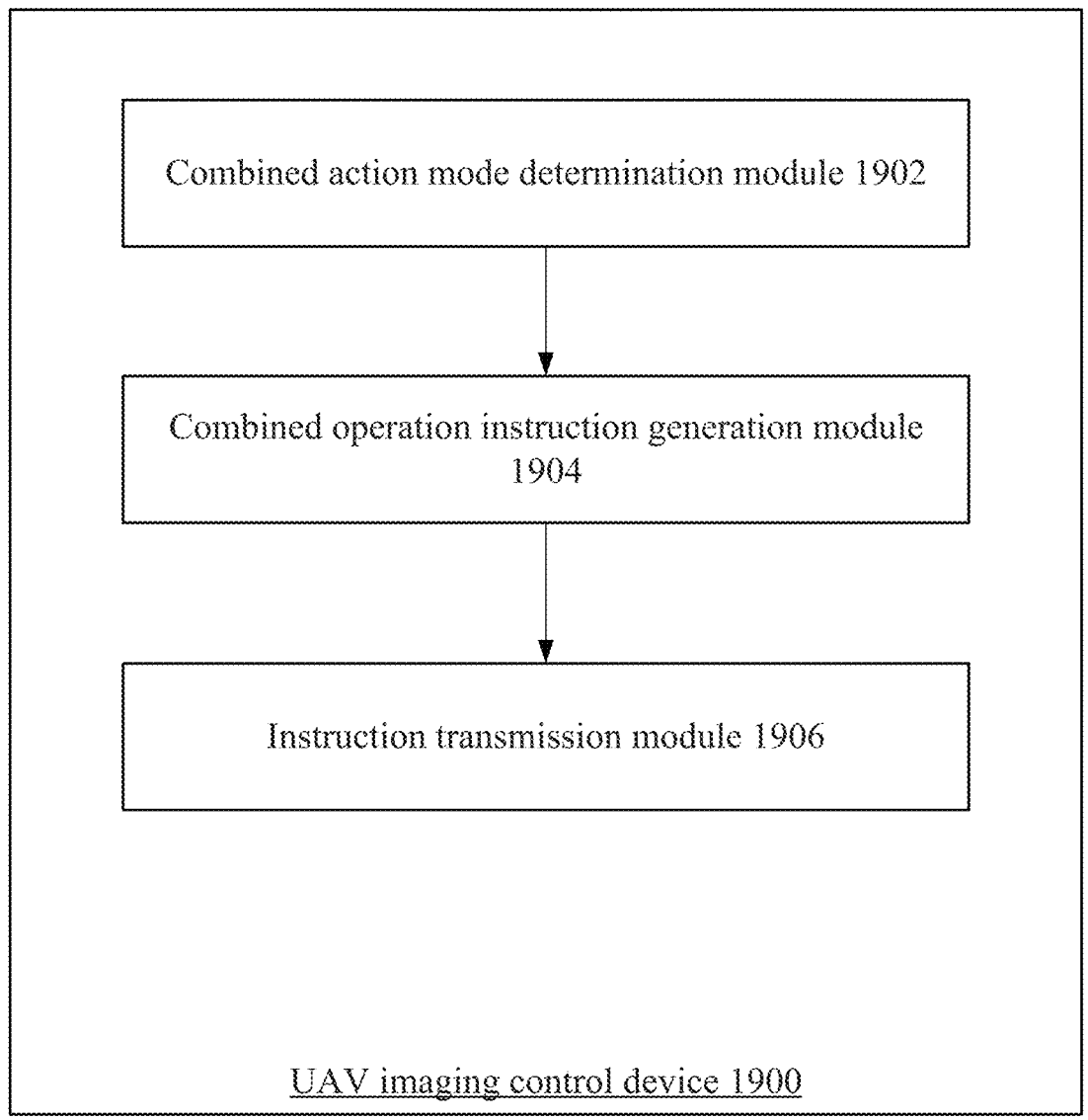
FIG. 19 is a schematic diagram of a UAV imaging control device, according to an example embodiment.

As shown in FIG. 19, in some embodiments, the present disclosure provides a UAV imaging control device 1900, i.e., the control terminal. The UAV imaging control device 1900 may include:

A combined action mode determination module 1902 configured to determine the combined action mode to be used for UAV imaging, the combined action mode including at least two action modes.

A combined operation instruction generation module 1904 configured to generate a combined operation instruction based on determined combination of action modes; and An instruction transmission module 1906 configured to transmit the combined operation instruction to enable the UAV to fly based on the combined operation instruction to capture videos.

In some embodiments of the present disclosure, the UAV imaging control device 1900 may include other functional modules not shown in FIG. 19. For example, the UAV imaging control device 1900 may include a target object determination module configured to determine a target object to be imaged. The UAV imaging control device 1900 may include a video processing module configured to acceleratively process at least one segment of the captured videos.

In addition, the UAV imaging control device 1900 may include other functional modules not shown in FIG. 19. Because such functional modules do not affect a person having ordinary skills in the art to understand the embodiments of the present disclosure, they are omitted in FIG. 19. For example, the UAV imaging control device 1900 may include one or multiple of the following functional modules: power source, storage device, data bus, antenna, wireless transceiver, etc.

Figure 20:
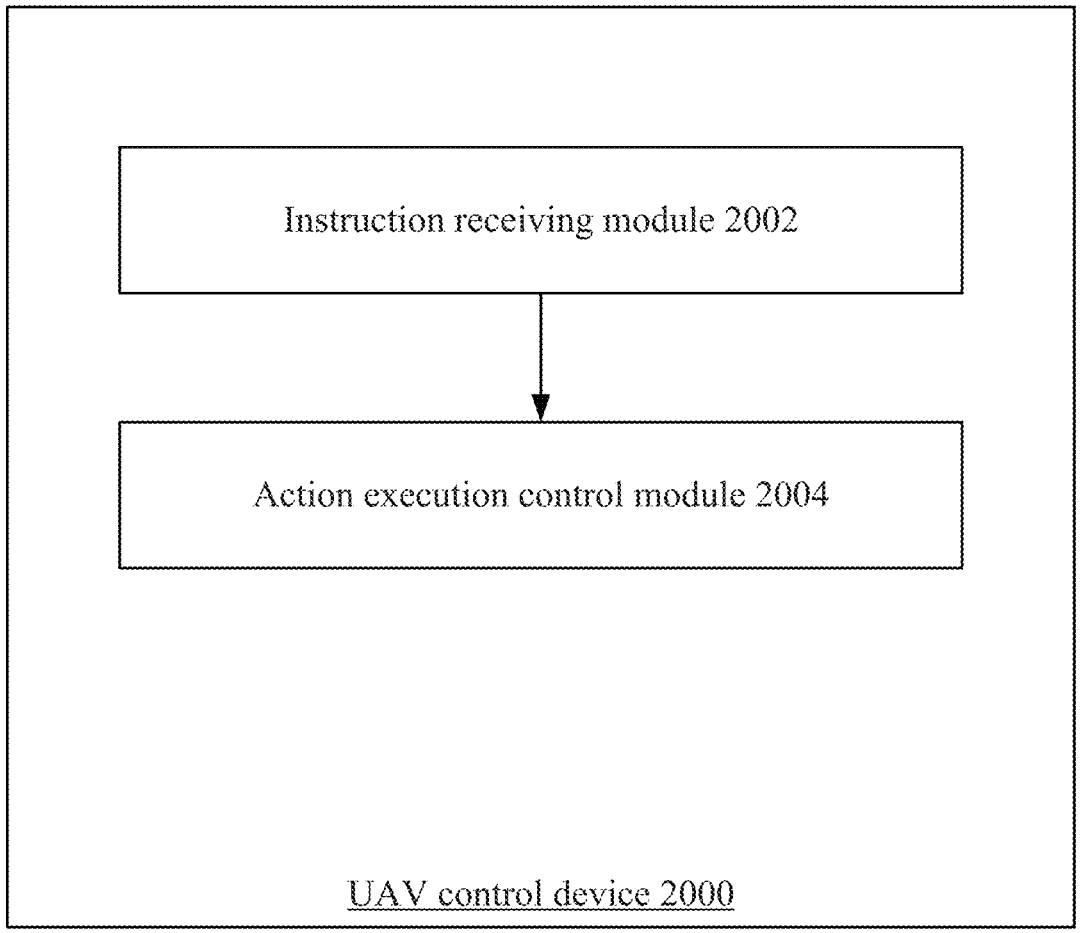
FIG. 20 is a schematic diagram of a UAV control device, according to an example embodiment.

As shown in FIG. 20, in some embodiments, the present disclosure provides a UAV control device 2000. The UAV control device 2000 may include:

An instruction receiving module 2002 configured to receive a combined operation instruction; and An action execution control module 2004 configured to control the UAV to fly based on at least two action modes and to capture videos according to the combined operation instruction.

In some embodiments, the UAV control device 2000 may include other functional modules not shown in FIG. 20. For example, the UAV control device 2000 may include a video processing module configured to acceleratively process at least one segment of the captured video.

In addition, the UAV control device 2000 may include other functional modules not shown in FIG. 20. However, because such functional modules do not affect a person having ordinary skills in the art to understand the embodiments, they are omitted in FIG. 20. For example, the UAV control device 2000 may include one or multiple of the following functional modules: power source, storage device, data bus, antenna, wireless transceiver, etc.

In view of at least one of above-mentioned embodiments, a combined operation instruction associated with one or more predetermined action modes may be automatically retrieved and transmitted to the UAV. The UAV may orderly execute a series of actions to capture images based on the combined operation instruction. As such, the user only needs to select predetermined action modes and trigger the imaging start instruction, in order to control the UAV to automatically accomplish a combined action mode, which not only simplifies the operations, but also improves the convenience of operations. In addition, the captured videos are continuous and smooth, which reduce time for late stage video processing.

The above describes some embodiments of the present disclosure through examples. A person having ordinary skills in the art can appreciate, that the above embodiments may be modified and varied without departing from the principles of the present disclosure. All of these modifications and variations fall within the scope of protection of the present disclosure. As such, the scope of protection of the present disclosure is that defined by the following claims.

What is claimed is:

1. An imaging control method for an unmanned aerial vehicle ("UAV"), comprising:
   receiving a video capturing instruction from a control terminal;
   determining, based on an imaging scene, a combined action mode, the combined action mode comprising a plurality of action modes, the plurality of action modes being different from each other, and the plurality of action modes comprising at least one of a type of the plurality of action modes, an arrangement order of the plurality of action modes, a flight trajectory of each of the plurality of action modes, a composition rule for the each of the plurality of action modes, or a flight duration of the each of the plurality of action modes; and capturing a video based on the combined action mode.

2. The imaging control method of claim 1, further comprising:

determining a target object, based on a user input, for the UAV to capture the video, wherein the user input comprises one or more of a type of the target object, geographical information of the target object, and a dimension of the target object; and identifying, by the control terminal, the target object based on the user input.

3. The imaging control method of claim 1, wherein the plurality of action modes comprises at least a first action mode and a second action mode, and the method further comprises:

generating a video by synthesizing a first video captured based on the first action mode and a second video captured based on the second action mode.

4. The imaging control method of claim 1, wherein capturing the video based on the combined action mode comprises:

causing the UAV to perform at least one of: flying based on a predetermined flight parameter associated with the combined action mode, or capturing the video based on a predetermined imaging parameter associated with the combined action mode.

5. The imaging control method of claim 4, wherein the predetermined flight parameter comprises a predetermined flight path, and causing the UAV to fly based on the predetermined flight parameter comprises:

causing the UAV to fly based on the predetermined flight path.

6. The imaging control method of claim 4, wherein the predetermined imaging parameter comprises a predetermined composition rule configured to cause a target object in an associated action mode to be located at a predetermined composition location.

7. The imaging control method of claim 1, wherein the plurality of action modes comprise at least two of a backward fly mode, a circling fly mode, a spiral fly mode, a roaring fly mode, or a comet fly mode.

8. The imaging control method of claim 1, wherein determining the combined action mode comprises:

receiving at least one of a user selection or an input of at least two action modes from the plurality of action modes; and determining the at least two action modes as the combined action mode for the UAV to capture the video.

9. The imaging control method of claim 1, wherein determining the combined action comprises:

automatically determining at least two predetermined action modes as the combined action mode for the UAV to capture the video.

10. The imaging control method of claim 9, wherein automatically determining the at least two predetermined action modes as the combined action mode for the UAV to capture the video comprises at least one of:

selecting a default action mode as the combined action mode for the UAV to capture the video;

selecting an action mode used in previous imaging performed by the UAV as the combined action mode to be used for current imaging performed by the UAV; or determining the combined action mode for the UAV to capture the video based on at least one of the followings: an environment in which a target object is located, or a relative location relationship between a target object and the UAV.

11. The imaging control method of claim 1, further comprising:

obtaining a video processing parameter, and wherein the video processing parameter comprising at least one of a number of segments the video is divided into, a time duration of each segment of the video, or an acceleration multiple for the video; and processing the captured video based on the video processing parameter.

12. The imaging control method of claim 1, further comprising:

sending the captured video to a control terminal, the control terminal being configured to perform accelerative processing on at least one segment of the captured video.

13. An imaging method for a system, the system comprising an unmanned aerial vehicle ("UAV") and a control terminal, the method comprising:

sending, by the control terminal, a video capturing instruction to the UAV to cause the UAV to fly according to the video capturing instruction to capture a video;

capturing the video by the UAV based on a combined action mode associated with an imaging scene, the combined action mode comprising a plurality of action modes, the plurality of action modes being different from each other, and the plurality of action modes comprising at least one of a type of the plurality of action modes, an arrangement order of the plurality of action modes, a flight trajectory of each of the plurality of action modes, a composition rule for the each of the plurality of action modes, or a flight duration of the each of the plurality of action modes;

receiving, by the control terminal, the video captured by the UAV and transmitted from the UAV; and performing, by the control terminal, an accelerative processing on at least one segment of the captured video to obtain a processed video.

14. The imaging method of claim 13, further comprising:

determining a target object, based on a user input, for the UAV to capture the video, wherein the user input comprises one or more of a type of the target object, geographical information of the target object, and a dimension of the target object; and identifying, by a control terminal, the target object based on the user input.

15. The imaging method of claim 13, wherein the plurality of action modes comprises at least a first action mode and a second action mode, and the method further comprises:

generate a video by synthesizing a first video captured based on the first action mode and a second video captured based on the second action mode, and transmitting the generated video by the UAV for accelerative processing.

16. The imaging method of claim 13, further comprising:

dividing the captured video into a number of stages, the number of stages including at least a starting stage, a middle stage, and a finishing stage.

17. The imaging method of claim 16, further comprising:
obtaining a close-up view of a target object at the starting stage, the target object being determined for the UAV to capture the video;
obtaining a panoramic image of an environment where the target object is located; and
obtaining a transitional view of the target object from the close-up view to the panoramic view of the environment where the target object is located.

18. The imaging method of claim 13, wherein:
each action mode in the plurality of action modes is associated with at least one of a predetermined flight parameter or a predetermined imaging parameter, and
capturing the video based on the combined action mode comprises at least one of: flying according to the predetermined flight parameter to capture the video, or capturing the video based on the predetermined imaging parameter.

19. The imaging method of claim 18, wherein:
the predetermined flight parameter comprises a predetermined flight path; or
the predetermined imaging parameter comprises a predetermined composition rule configured to cause a target object in an associated action mode to be located at a predetermined composition location.

20. An unmanned aerial vehicle ("UAV"), comprising:
a UAV control device, comprising:
a storage device configured to store an executable instruction; and
a processor configured to execute the executable instruction stored in the storage device,
wherein the executable instruction, when executed by the processor, is configured to cause the processor to:
receive a video capturing instruction from a control terminal;
determine, based on an imaging scene, a combined action mode, the combined action mode comprising at least one of a plurality of action modes, the plurality of action modes being different from each other, and the plurality of action modes comprising a type of the plurality of action modes, an arrangement order of the plurality of action modes, a flight trajectory of each of the plurality of action modes, a composition rule for the each of the plurality of action modes, or a flight duration of the each of the plurality of action modes; and
capture a video based on the combined action mode.

* * * * *